United States Patent [19]
Iwagaki et al.

[11] Patent Number: 5,223,871
[45] Date of Patent: Jun. 29, 1993

[54] CAMERA UNIT

[75] Inventors: Masaru Iwagaki; Atsuo Ezaki; Kazuo Todo, all of Hachioji, Japan

[73] Assignee: Konica Corporation, Tokyo, Japan

[21] Appl. No.: 823,464

[22] Filed: Jan. 22, 1992

[30] Foreign Application Priority Data

Jan. 23, 1991 [JP] Japan .................. 3-022926

[51] Int. Cl.[5] ............................................. G03B 29/00
[52] U.S. Cl. ..................... 354/75; 354/288; 354/94; 354/100
[58] Field of Search ............ 354/75, 94, 100, 288

[56] References Cited

FOREIGN PATENT DOCUMENTS

| | | |
|---|---|---|
| 46-30055 | 10/1971 | Japan . |
| 54-111822 | 9/1979 | Japan . |
| 59-52238 | 3/1984 | Japan . |
| 59-177535 | 10/1984 | Japan . |
| 60-35726 | 2/1985 | Japan . |
| 60-120448 | 6/1985 | Japan . |
| 60-138538 | 7/1985 | Japan . |
| 60-143331 | 7/1985 | Japan . |
| 60-258536 | 12/1985 | Japan . |
| 61-14636 | 1/1986 | Japan . |
| 61-146363 | 7/1986 | Japan . |
| 2-136247 | 11/1990 | Japan . |
| 2-136248 | 11/1990 | Japan . |
| 2-275441 | 11/1990 | Japan . |
| 2-275442 | 11/1990 | Japan . |

OTHER PUBLICATIONS

"Kiso Bunseki Kagaku Koza, 24: X-sen Bunseki" (Basic Course for Analytical Chemistry, 24: X-ray Analysis), published by Kyoritsu Shuppan, 1968.
Research Disclosure No. 17643, pp. 22–31, Industrial Opportunities Ltd., Dec. 1978.
Research Disclosure No. 18716, pp. 647–651, Industrial Opportunities Ltd., Nov. 1979.
Research Disclosure No. 308119, pp. 993–1015, Kenneth Mason Publications Ltd., Dec. 1989.

*Primary Examiner*—Monroe H. Hayes
*Attorney, Agent, or Firm*—Finnegan, Henderson, Farabow, Garrett & Dunner

[57] ABSTRACT

A camera unit is disclosed. The camera unit is packed in the form of a product comprising a camera and a silver halide color photographic light-sensitive material loaded beforehand in the camera. The camera comprises a lens having a focal length of not more than 23 mm, and the light-sensitive material has an ISO speed of not less than 300 and at least one of the emulsion layers of said light-sensitive material has a specified shape in the photographic characteristic curve thereof.

13 Claims, 4 Drawing Sheets

CAMERA UNIT

FIELD OF THE INVENTION

The present invention relates to a camera unit which is loaded with a silver halide color photographic light-sensitive material, and more particularly to a wide-angle-lens camera which is easy to handle and provides a high yield of high-quality image prints.

BACKGROUND OF THE INVENTION

In recent years there have become popularlized disposable-type simple plastic camera products sold in the form of being loaded with a silver halide color light-sensitive material. These products have liberated customers from such trouble or failure in film-loading as in ordinary cameras and their simplicity and ease of handling have increased picture-taking chances. Further, those of the terephoto type or superwide angle lens type with built-in electronic flash for diverse uses have been newly developed as well to be made practical reality.

However, the above camera unit product, aimed at reduction of its cost, have extremely simplified driving, optical and electric systems unlike those of ordinary cameras, so that it necessarily tends to produce unsatisfactory results of processed film images and of the finished quality of images printed therefrom, which thus needs to be improved. Particularly in the case of a superwide-angle lens camera unit, it has been found that since a wide field of view of a subject is taken in a frame, there is a high probability to produce an image having a high brightness ratio, resulting in drop of the yield of acceptable prints. The image quality deterioration in the periphery of the frame due to the aberration of the superwide-angle lens becomes a problem as well. Further, the unit has the disadvantage that its price per frame is high because of its disposableness, and the recycling of it after use is troublesome. There has been a demand for improving the above problems.

SUMMARY OF THE INVENTION

It is an object of the present invention to provide a color photographic light-sensitive material-loaded camera unit which is easy to handle, inexpensive and enables a high yield of color prints without causing image quality deteriation.

The present invention is accomplished by a camera unit packed in the form of a product comprising a camera and a silver halide color photographic light-sensitive material loaded thereinside beforehand.

The camera has a lens of a focal length of not more than 23 mm, and the silver halide color light-sensitive material has an ISO speed of not less than 300 and comprises a support having thereon a red-sensitive emulsion layer for forming a cyan image, a green-sensitive emulsion layer for forming a magenta image and a blue-sensitive emulsion layer for forming a yellow image. In the light-sensitive material, at least one of the emulsion layers has a photographic characteristic curve satisfying the following requirements, the ratios $j_1 = g_1/h$, $j_2 = g_2/h$, $j_3 = g_3/h$, $j_4 = g_4/h$ and $j_5 = g_5/h$ are each $1.00 \pm 0.10$, wherein $g_1$, $g_2$, $g_3$, $g_4$ and $g_5$ are defined by equations $g_1 = (d_1 - d_0)/0.5$, $g_2 = (d_2 - d_1)/0.5$, $g_3 = (d_3 - d_2)/0.5$, $g_4 = (d_4 - d_3)/0.5$, $g_5 = (d_5 - d_4)/0.5$; and h is defined by an equation $h = (d_5 - d_0)/2.5$, in which $d_0$ is the density of $Dmin \pm 0.15$, Dmin is the minimum density of the characteristic curve, and $d_1$, $d_2$, $d_3$ and $d_4$ are each densities corresponding to the exposure amounts of $\log E_1 = \log E_0 + 0.5$, $\log E_2 = \log E_1 + 0.5$, $\log E_3 = \log$, $E_2 + 0.5$, $\log E_4 = \log E_3 + 0.5$ and $\log E_5 = \log E_4 + 0.5$, respectively, in which $E_0$ is an exposure amount necessary for forming the density of $d_0$.

DETAILED DESCRIPTION OF THE INVENTION

Figure 1:
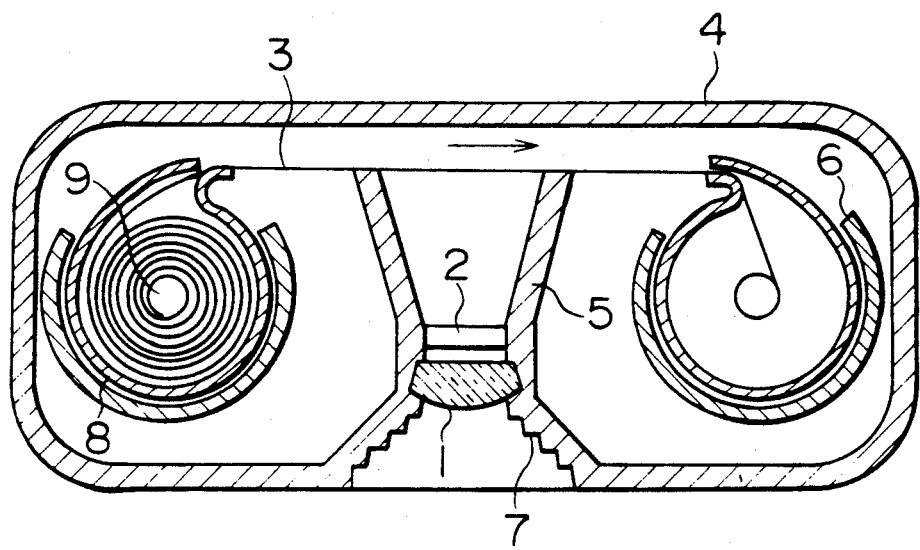
FIG. 1 is a cross-sectional view of an example of the camera unit of the invention, cut horizontally by a plane formed by the lens's optical axis and film transport direction.
Figure 3:
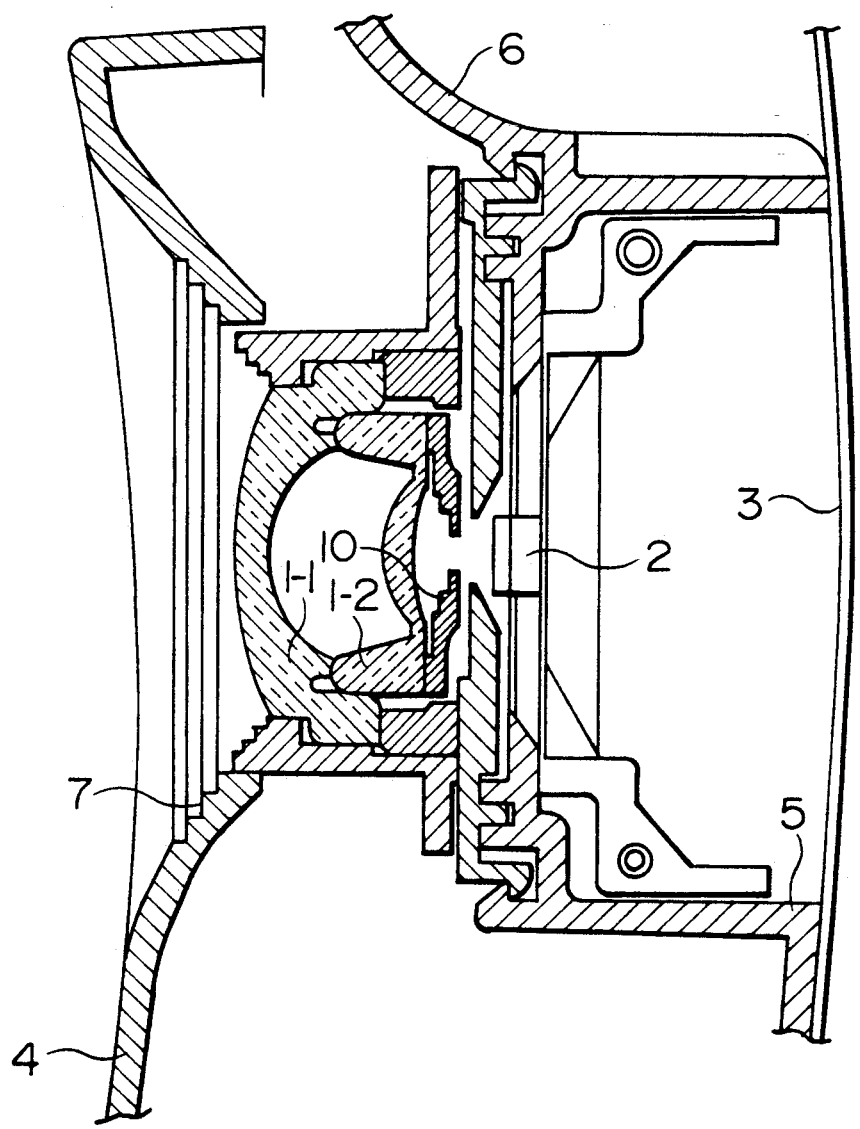
FIG. 3 is a partial cross-sectional view of an example of the camera unit of the invention, cut by a plane formed by the lens's optical axis and film transport direction.
Figure 4:
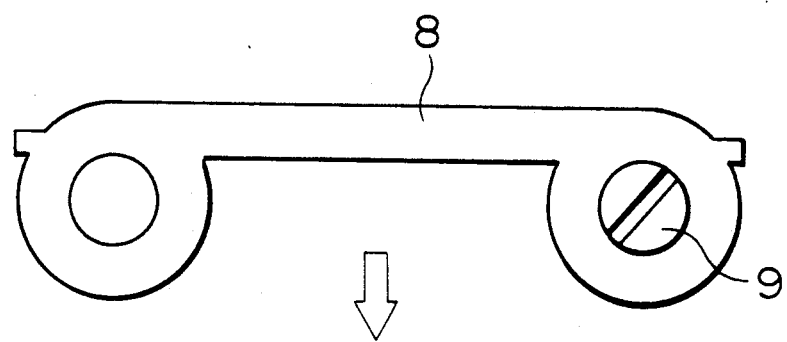
FIG. 4 is a drawing showing a cross-sectional view of an example of the camera part of the camera unit of the invention, cut by a plane formed by the lens's optical axis and film transport direction, and a side view of the cartridge of the camera.
Figure 4:
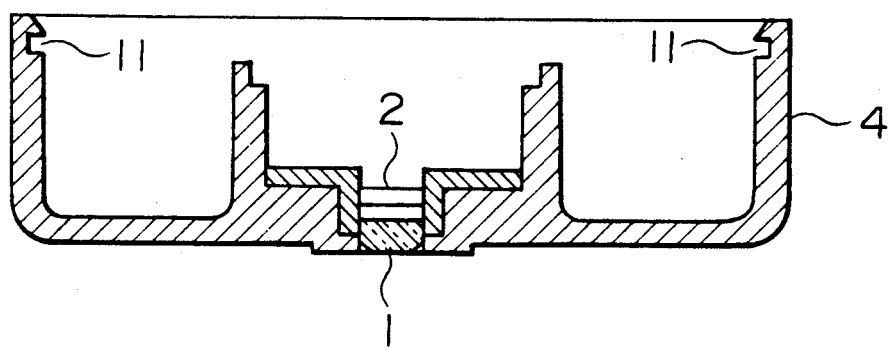

In the invention, the camera unit may be either one having a camera body loaded with a film cartridge having a silver halide color light-sensitive material 3 thereinside as shown in FIG. 1 or one comprising a camera body 4 and a film cartridge part 8, in which the cartridge is designed so as to be attachable to and detachable from the camera part and also serves as the backlid of the camera body, as shown in FIG. 4. In the cartridge, the light-sensitive material is rolled on a spool 9. The cartridge is fixed to the camera body by a hook 11 in the type of camera unit as shown in FIG. 4. The latter type of camera unit of FIG. 4 is more advantageous in that the camera body can be reused, while the cartridge can be recycled In FIGS. 1 to 4, 1 is a lens, 2 is a shutter, 5 is a light-shielding plate having an aperture, 6 is a cartridge holder, 7 is a stray light inhibiting means and 10 is a diaphragm.

In the invention, the focal length of the lens is preferably not more than 23 mm, more preferably not more than 20 mm, and most preferably 15 to 19 mm. The lens may be a single lens, but is preferably a 2-group-2-element or above lens. In the case of the 2-group-2-element lens, it consists of a first lens having a negative refractive index and a second lens having a positive refractive index. The superwide-angle lens of the camera unit of the invention preferably has at least one aspherical plane, which is useful for the object of the invention to improving both image quality and yield of prints. Further, if the lens satisfies the following conditions represented by Formulas (4) to (7), the improving effect can be enhanced.

Namely, if the focal length of the first lens is denoted by $f_1$, and that of the second lens by $f_2$, these $f_1$ and $f_2$ preferably satisfy the requirement of Formula (4), $$-3 < f_1/f_2 < -1 \qquad (4)$$

This condition is for lessening the curvature of the image plane. If the $f_1/f_2$ exceeds the upper limit of the range, the image plane curvature becomes positive, while if it exceeds the lower limit of the range, the curvature becomes negative, so that the above condition of Formula (4) is preferably met in order to maintain the image plane curvature properly.

When constructed according to the invention, the two lenses, even if made of the same material, can be achromatic to show a sufficient performance. In this instance, the use of an acryl as the material of the two lenses is very suitable not only for cost reduction but also as the lens for the camera unit of the invention.

In order to provide the above achromaticity satisfactorily, the distance d between the first and second lenses, along with the above focal lengths $f_1$ and $f_2$, preferably satisfies the condition represented by Formula (5):

$$-1.5 < f_1/f_2 + \{f_1/(f_1-d)\}^2 < -0.5, \quad (5)$$

because if the distance exceeds the upper limit of the above range, the chromatic aberration of the F line becomes negative, while if it gets out of the lower limit, the chromatic aberration value increases on the positive side.

For good correction of the astigmatism and distortion, the first lens should be a concave meniscus lens, and the refractive index n of the material of the first lens and the radius curvature $r_2$ of the second plane of the first lens, along with the above focal length $f_1$, preferably satisfy the condition represented by Formula (6):

$$-1 < r_2/\{(n-1)f_1\} < -0.5 \quad (6)$$

If the value exceeds the upper limit of the above range the astigmatism increases on the positive side, while if it gets out of the lower limit, not only does the astigmatism increase on the negative side but the distortion increases on the negative side as well. Therefore, it is preferable for the lens to satisfy the condition of Formula (6) in order to properly correct these aberrations thereof.

Further, the distance d between the first and second lenses, along with the focal length $f_1$, preferably satisfies the condition of Formula (7)

$$-0.5 < d/f_1 < 0 \quad (7)$$

Because if the $d/f_1$ value exceeds the upper limit of Formula (7), the back focus shortenes, while if it gets out of the lower limit, the first lens increases in size to excess.

The shutter of the camera unit of the invention may be either of the variable-speed type or of the fixed-speed type, but is preferably of the fixed-speed type in consideration of the ease of handling, characteristics of a silver halide color light-sensitive material used and reduction in cost of the camera unit, and the speed range is preferably 1/25 to 1/500 sec., more preferably 1/150 to 1/250 sec. and most preferably 1/80 to 125 sec. The F-number of the lens is preferably 12.5 or more, more preferably 13.0 or more, and most preferably 13.5 or more. The lens having the above F-number, by being used in combination with the characteristics of the silver halide color light-sensitive material of the invention, can accomplish the object of the invention—high image quality and improvement of the yield of prints. The combined use of a lens having a focal length of 20 mm or less, a F-number of 12.5 or more and a silver halide color light-sensitive material having an ISO speed of 300 or more enables close-ups by the superwide-angle lens camera unit: e.g., a well-focused picture can be taken even at the shortest object distance of 80cm or less from the film plane. The combination of a lens of a focal length of 17 mm, a F-number of 13.5 and a silver halide color light-sensitive material having an ISO speed of 400 enables the close-up at an object distance of 30 cm.

The visual field rate of the view finder of a camera is a percentage of the object field visible through the finder to the image frame field formed on a silver halide color light-sensitive material. An ordinary camera is so designed as to form a wider field image on the silver halide color light-sensitive material than the field of an object viewed through the finder by a picture taker. The visual field rate of the view finder is usually less than 90%. A less than 90% visual field rate has the following disadvantage; especially in a superwide-angle-less camera, a picture taker moves back away from the object with viewing through the finder in trying to take a picture containing as much wide field of view as possible, and as a result, the photographed image is found covering a much wider field of the object than expected in the visual confirmation through the finder; i.e., the whole image of the intended object is found small contrary to his expectation, thus resulting in a picture that lacks appealingness particularly where the object includes figures, which customers complain about. It is true that when an intended object appears small in size on a print, its image quality is visually lowered.

The invention, by the combined use of a lens having a focal length of not more than 23 mm and a view finder having a visual field rate of more than 90%, can provide a camera unit capable of producing a photograph having an excellent image quality without impairing appealingness, and the above effect can be more enhanced by the additional use of the silver halide color light-sensitive material of the invention and a F-number of not less than 12.5 in combination.

The camera unit of the invention may have an electronic flash lamp. The combination of the electronic flash light with a silver halide color light-sensitive material having the characteristics according to the invention, even in a F-number of more than 12.5, makes it possible to remarkably lessen the failure in taking pictures of such dim scenes as at dawn or dusk or of indoor scenes. In the invention, where the camera unit has an electronic flash lamp, the unit is preferably provided with a means to extensively scatter the electronic flash light. The power source for the electronic flash light may be an ordinary alkaline storage battery, but is preferably a lithium cell, and more preferably a rechargeable battery, from the view point of preventing possible environmental pollutions due to the used batteries discarded or lessening the recycling problem of the used batteries. In the case of a camera unit comprising a camera part and a cartridge part, wherein the cartridge is attachable to and detachable from the camera part, as shown in FIG. 4, if a rechargeable battery is used on the camera side, it is possible to recharge the battery in reusing the camera part, thus leading to large merits for both effective use of resources and prevention of environmental pollutions.

Figure 5:
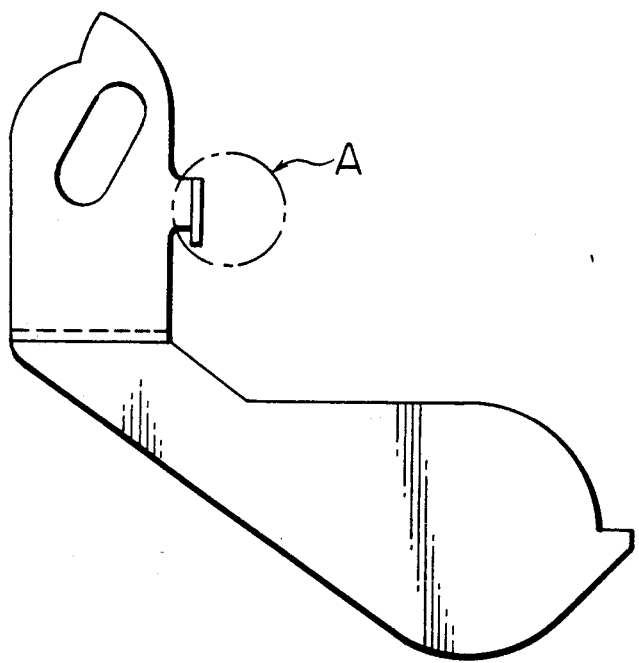
FIG. 5 is a drawing showing an example of the shutter blade of the camera unit of the invention.
Figure 5:
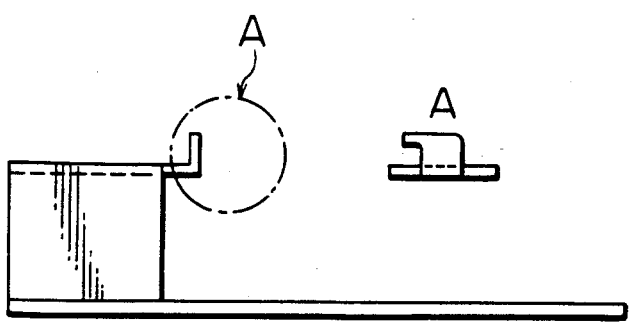

The use of a shutter blade in the form shown in FIG. 5 in combination with the lens having a fixed F-number of 12.5 or more according to the invention can simplify the camera mechanism without light leakage. In the invention, the cartridge part is one comprising a cartridge and a light-sensitive material in the film roll form loaded therein, said cartridge comprising a film roll chamber for holding an unexposed lightsensitive material in the roll form, a take-up chamber in which the exposed light-sensitive material is to be wound up, and a bridge portion having an opening area of 400 mm$^2$ or more to serve for connecting both chambers.

The above opening area, taking into account the balance between the image quality and the camera size, is preferably 600 to 2,500 mm$^2$, and more preferably 800 to 1200 mm$^2$. In the invention, this opening area is substantially an effective image area.

The form of the opening area is preferably a rectangular form, of which the long side/short side ratio, in consideration of the camera form, is preferably 1.2 to 2.0, and more preferably 1.4 to 1.6 which provides a visually stable image.

The size of the light-sensitive material in the roll form to be loaded in the cartridge is desirable to apply in its width and length to the system prevailing in the current market, and is preferably 35±1 mm in width and in approximately the same lengths as those of 12-, 20-, 24- and 36-exposure 135 type films. However, the light-sensitive material, by making its film base thinner, can be elongated to such an extent as 72-exposure or 100-exposure film size.

The light-sensitive material is preferably connected to a spool in at least either one of the film roll chamber and take-up chamber.

The cartridge body of the invention is preferably made of a plastic material for making it light-weight, easy to handle, inexpensive and reusable.

As a preferred plastic cartridge there may be used known cartridge as long as it meets the requirements: (1) it should have excellent lighttightness, (2) it should little affect the photographic characteristics of a light-sensitive material, and (3) it should be able to be easily recycled. Preferred examples of the plastic material of the cartridge include polystyrene, polypropylene, polyethylene, polyvinyl chloride, polymethyl methacrylate, polyethylene terephthalate, cellulose acetate and copolymers thereof which are all made lighttight by the incorporation of carbon black or other pigments. In order to make the cartridge's recycling more effective, the spool inside the cartridge also is preferably made of the same plastic material as that of the cartridge body.

In the invention, the cartridge to be loaded with a lightsensitive material, since it has an opening for image exposure, is preferably provided with a lightproof means, such as the elastic lightproof member disclosed in JP O.P.I. No. 120448/1985, the lightproof member disclosed in JU O.P.I. No. 136247/1990, the pressed lightproof member disclosed in JU O.P.I. No. 136248/1990, the lightproof paper disclosed in JP O.P.I. Nos. 275441 and 275442/1990, and the lightproofed path disclosed in JP O.P.I. No. 111822/1979 and JU E.P. No. 30055/1971.

In the invention, both the cartridge part and the camera part preferably have the relation of being attachable to and detachable from each other for loading and unloading. Accordingly, at least one of both parts preferably has a snapping means for loading and unloading, and further preferably has a stopper for preventing the unloading by mishandling.

In the invention, the cartridge part, when combined with the camera part, preferably serves also as the backlid of the camera unit from the viewpoint of making the camera unit lightweight, easy to handle and reusable, an example of which is shown in FIG. 3.

The camera unit of the invention is a composite of the camera part and the cartridge part, but further preferably has its outside partly or wholly protected with a cover that functions to absorb an impact that possibly occurs in case of falling by user's mistake to thereby not only prevent the driving, optical and electrical systems from being out of order or prevent possible image-skip trouble on the light-sensitive material but also prevent possible loss of the precious exposed image information caused by the camera/cartridge separation by accidental mishandling.

The cover is preferably made of an impact-absorbing material such as paper, sponge, rubber, leather or cloth.

The cover may be in any form, preferably in the beltlike or box form, and more preferably in the box form having appropriate holes for allowing the lens, finder, electronic flash, shutter button and film winder to be freely operated.

The camera unit of the invention is preferably packed in a plastic case or a hermetically sealed moistureproof bag during the period from its manufacture until the time when used. The hermetically sealed inside air is preferably at 25° C./30 to 70%RH, more preferably 40 to 60%RH, and most preferably 45 to 55%RH. Further, the inside air preferably has its oxygen partial pressure made lower than that of the air by filling an inert gas therein.

The method for producing the camera unit of the invention is described below:

Firstly, the camera part of the camera unit is produced. On the other hand, a light-sensitive material produced is slit and cross-cut into a given size strip in the beltlike form, an end of which is then connected to a spool, and the strip is wound therearound to be in the roll form, and then loaded into the film roll chamber of the cartridge. Next, the other end is connected to the take-up spool in the take-up chamber or the cartridge, which is then closed with its lid to be light-tight, whereby the cartridge part is produced. The above-produced camera part is then coupled with the cartridge part to thereby complete a camera unit.

The aforementioned camera part may be a newly produced one, but may also be one separated and recycled from the already sold and used units. The reuse of the returnable camera part mentioned above is preferred in view of the effective use of resources, prevention of the environmental pollution due to wastes and facilitation of recycling. In the reuse of the above camera part, an inspection is preferably made as needed prior to coupling it with the cartridge part, and its reusing frequency is preferably recorded on the camera body.

The camera part, if having a battery, can be reused after checking its residual voltage, while if having a rechargeable battery, can be reused after recharging it; the latter is particularly preferred since it leads to largely reducing the environmental pollution by discarded batteries.

In the invention, the newly assembled shutter unit of the camera part is repeatedly charged and released 25 times or more and then the camera part is coupled with the cartridge part to be made into a camera unit product to be shipped and sold on the market, whereby the resulting print quality can be improved.

Accordingly, a once-used camera part, since its shutter charging and releasing operations have been sufficiently made, has no problem of the resulting image quality in its reuse. Therefore, the reusing frequency of the camera part is preferably 2 to 100 times, more preferably 3 to 50 times, and most preferably 4 to 20 times.

After the camera unit of the invention is used for photographing by a general user, (1) its cartiridge part may be separated from its camera part by the user, and sent by mail or transported through a dealer to a photofinisher, and then the exposed light-sensitive material is pulled out of the cartridge for processing at the photofinishing laboratory, (2) in (1), the cartridge part may be separated from the camera part by the dealer, or (3) in (1), the cartridge part may be separated from the camera part by the photofinisher.

In the case of (1), the user can buy a new cartridge part alone to set it to his used camera part for taking pictures. In (2), the dealer can couple a new cartridge with the used camera part for selling. In the case of (2) or (3), the maker of the product can recover the used camera part, check the part as needed, and then couple a new cartridge part with it for shipping and selling.

On the other hand, the cartridge parts are all accumulated in the photofinisher. These cartridges of the invention, emptied after pulling the light-sensitive material out of it, have a merit of being easily recycled because they are free of batteries, electronic flash lamps, metals, different plastics and paper pieces.

The camera unit of the invention has a whole volume of preferably 150 to 190 cm$^3$ in order to make it lightweight and easy to handle. If the form of the camera unit is regarded as a rectangular parallelopipedone, the second longest one of the three sides thereof is preferably 5.0 to 8.0 cm. The camera unit that meets this requirement can be well-fittingly put in the pocket of a shirt without being slipped out of place, thus being excellent in the portability.

The minimum density and specific value in the invention should be determined according to the following testing procedures.

(1) Test conditions

A run of tests should be made in a room at a temperature of 20±5° C. with a relative humidity of 60±10%, and the light-sensitive material should be tested after being allowed to stand for at least one hour under the above atmospheric condition.

(2) Exposure a. The relative spectral energy distribution of the reference light at the exposure plane should be as given in Table 1.

TABLE 1

| Wavelength nm | Relative spectral energy*1 |
|---|---|
| 360 | 2 |
| 370 | 8 |
| 380 | 14 |
| 390 | 23 |
| 400 | 45 |
| 410 | 57 |
| 420 | 63 |

TABLE 1-continued

| Wavelength nm | Relative spectral energy*1 |
|---|---|
| 430 | 62 |
| 440 | 31 |
| 450 | 93 |
| 460 | 97 |
| 470 | 98 |
| 480 | 101 |
| 490 | 97 |
| 500 | 100 |
| 510 | 101 |
| 520 | 100 |
| 530 | 104 |
| 540 | 102 |
| 550 | 103 |
| 560 | 100 |
| 570 | 97 |
| 580 | 98 |
| 590 | 90 |
| 600 | 93 |
| 610 | 94 |
| 620 | 92 |
| 630 | 88 |
| 640 | 89 |
| 650 | 86 |
| 660 | 86 |
| 670 | 89 |
| 680 | 85 |
| 690 | 75 |
| 700 | 77 |

Note: *1Relative values to the value at 560 nm set at 100.

b. Changes in the illuminance at the exposure plane are made by use of an optical step wedge. Any step of the optical wedge used should have a spectral transmission density variation of not more than 10% in the region of less than 400 nm, and of not more than 5% in the region of not less than 400 nm within the wavelength region range of from 360 to 700 nm.

c. Exposure time: 100 sec.

(3) Processing a. The light-sensitive material to be examined should be allowed to stand in an atmosphere maintained at a temperature of 20°±5° C. with a relative humidity of 60±10% during the period between its exposure and its processing.

b. The processing should be completed within the period of 30 minutes to 6 hours after the exposure.

c. The processing should be performed as follows:

| Color developing | 38.0 ± 0.1° C. | 3 min. 15 sec. |
|---|---|---|
| Bleaching | 38.0 ± 3.0° C. | 6 min. 30 sec. |
| Washing | 24 to 41° C. | 3 min. 15 sec. |
| Fixing | 38.0 ± 3.0° C. | 6 min. 30 sec. |
| Washing | 24 to 41° C. | 3 min. 15 sec. |
| Stabilizing | 38.0 ± 3.0° C. | 3 min. 15 sec. |
| Drying | 50° C. or lower | |

The compositions of the processing solutions used are as follows:

| Color developer | |
|---|---|
| 4-Amino-3-methyl-N-ethyl-N-(β-hydroxyethyl)-aniline sulfate | 4.75 g |
| Anhydrous sodium sulfite | 4.25 g |
| Hydroxylamine ½ sulfate | 2.0 g |
| Anhydrous potassium carbonate | 37.5 g |
| Sodium bromide | 1.3 g |
| Trisodium nitrilotriacetate, monohydrate | 2.5 g |
| Potassium hydroxide | 1.0 g |
| Water to make one liter. (pH = 10.1) | |

-continued

| Bleaching bath | |
|---|---|
| Ferric ammonium ethylenediaminetetraacetate | 100.0 g |
| Diammonium ethylenediaminetetraacetate | 10.0 g |
| Ammonium bromide | 150.0 g |
| Glacial acetic acid | 10.0 g |
| Water to make one liter. | |
| Adjust pH to 6.0 with ammonia water. | |
| Fixing bath | |
| Ammonium thiosulfate | 175.0 g |
| Anhydrous sodium sulfite | 8.5 g |
| Sodium metasulfite | 2.3 g |
| Water to make on liter. | |
| Adjust pH to 6.0 with acetic acid. | |
| Stabilizing bath | |
| Formalin (37% aqueous solution) | 1.5 ml |
| Koniducks (product of KONICA Corp.) | 7.5 ml |
| Water to make one liter. | |

(4) Density measurement

The density is expressed in terms of $\log_{10}(\phi_0/\phi)$, wherein $\phi_0$ represents a lighting luminous flux for density measurement and $\phi$ is a transmission luminous flux at an area to be measured. As the geometrical condition for the density measurement, basically a parallel light in the normal line direction is used as the lighting luminous flux, while all the light transmitted and scattered around in a half space is used as the transmission luminous flux. Where a measuring method different from the above is used, the lighting luminous flux used therefor needs to be corrected with a reference density piece. In the density measurement, a test piece should be placed with its emulsion side facing the light receptor. The density measurement is made to obtain blue, green and red status M densities, whose spectral characteristics are shown in the form of the overall characteristics of the light source, optical system, optical filter and light receptor used in the densitometer in Table 2.

TABLE 2

| Status M density characteristics (in logarithm, peak set at 5.00) | | | |
|---|---|---|---|
| Wavelength nm | Blue | Green | Red |
| 400 | * | ↑ | ↑ |
| 410 | 2.10 | ↑ | ↑ |
| 420 | 4.11 | ↑ | ↑ |
| 430 | 4.63 | * | ↑ |
| 440 | 4.37 | ↓ | ↑ |
| 450 | 5.00 | ↓ | ↑ |
| 460 | 4.95 | ↓ | ↑ |
| 470 | 4.74 | 1.13 | ↑ |
| 480 | 4.34 | 2.19 | ↑ |
| 490 | 3.74 | 3.14 | ↑ |
| 500 | 2.99 | 3.79 | ↑ |
| 510 | 1.35 | 4.25 | * |
| 520 | ↑ | 4.61 | ↓ |
| 530 | ↑ | 4.85 | ↓ |
| 540 | ↑ | 4.98 | ↓ |
| 550 | ↑ | 4.98 | ↓ |
| 560 | ↑ | 4.80 | ↓ |
| 570 | ** | 4.44 | ↓ |
| 580 | ↓ | 3.90 | ↓ |
| 590 | ↓ | 3.15 | ↓ |
| 600 | ↓ | 2.22 | ↓ |
| 610 | ↓ | 1.05 | ↓ |
| 620 | ↓ | ↑ | 2.11 |
| 630 | ↓ | ↑ | 4.48 |
| 640 | ↓ | ↑ | 5.00 |
| 650 | ↓ | ↑ | 4.90 |
| 660 | ↓ | ↑ | 4.58 |
| 670 | ↓ | ↑ | 4.25 |
| 680 | ↓ | ** | 3.88 |
| 690 | ↓ | ↓ | 3.49 |
| 700 | ↓ | ↓ | 3.10 |
| 710 | ↓ | ↓ | 2.69 |
| 720 | ↓ | ↓ | 2.27 |
| 730 | ↓ | ↓ | 1.86 |
| 740 | ↓ | ↓ | 1.45 |
| 750 | ↓ | ↓ | 1.05 ** |

Note:
*Slope of red: 0.260/nm, slope of green: 0.106/nm, slope of blue: 0.250/nm.
**Slope of red: 0.040/nm, slope of green: 0.120/nm, slope of blue: 0.220/nm.

The blue, green and red density values obtained by the above density measurement of a light-sensitive material exposed and processed in the above procedure are plotted so as to correspond to the common logarithmic values of exposure amounts (log E) to thereby determine characteristic curves or D-(log E) curves.

In the invention, the above-mentioned characteristic curves are obtained, and the minimum yellow density Dmin (Y), the minimum magenta density Dmin (M) and the minimum cyan density Dmin (C) are found therefrom.

In the invention, the hereinafter described $g_i/h$ values (i=1, 2, 3, 4, 5) are found from the yellow, magenta and cyan photographic characteristic curves. That is, the range of from the exposure amount log $E_0$ giving a density $d^0$=Dmin+0.15 to the log $E_5$ at $\Delta$log E=2.5 therefrom is marked off at intervals of $\Delta$log E=0.5 to thereby make exposure points log $E_i$ (i=0, 1, 2, 3, 4 and 5) and densities $d_i$ (i=0, 1, 2, 3, 4 and 5) given by log $E_i$ to define gi and h by the following equations (1) and (2):

$$g_i = \frac{d_i - d_i}{0.5} \quad (1)$$

$$h = \frac{d_5 - d_0}{2.5} \quad (2)$$

In the invention, the ratio $j_i$ of $g_i/h$ in at least one of the photographic characteristic curves of yellow, magenta and cyan images shall be in the following range:

$$j_i = g_i/h = 1.00 \pm 0.10 \quad (3)$$

In the invention, the characteristic curve in the above range is preferably of a magenta image, more preferably of magenta and cyan images, and most preferably of yellow, magenta and cyan images.

The ISO speed of the silver halide light-sensitive material used in the invention should be 300 or more.

The ISO speed herein is determined from the above-mentioned photographic characteristic curve according to the following procedures (1) to (3).

(1) Exposure amounts corresponding to densities 0.15 higher than the respective minimum densities of blue, green and red are expressed in lux.sec and denoted by $E_B$, $E_G$ and $E_R$, respectively.

(2) The larger one in value of $E_B$ and $E_R$ (the one having a lower sensitivity) is regarded as $E_S$.

(3) ISO speed is calculated based on the value of $E_S$.

At least one of the red-sensitive, green-sensitive and blue-sensitive layers in the invention is preferably comprised of three sublayers, and the camera unit of the invention is preferably equipped with a built-in electronic flash lamp, whose guide number is preferably 4 or more.

The above-mentioned construction of the invention facilitates the obtaining of photographic images rich in color and gradations adaptable to diverse photographing environments such as overexposure and underexposure.

The color light-sensitive material of the invention preferably comprises a monodisperse silver halide emulsion. The monodisperse silver halide emulsion herein is an emulsion in which the weight of its silver halide grains included in the average grain diameter dm ±20% range accounts for preferably not less than 70%, more preferably not less than 80% and most preferably not less than 90% of the weight of the whole silver halide grains thereof.

The above average grain diameter dm is defined as the grain diameter $d_i$ obtained when $d_i^3$ multiplied by the frequency $n_i$ of grain diameter $d_i$ becomes maximum (rounded to three decimal places).

The grain diameter can be obtained by actually measuring the diameter of a photographically printed grain image magnified 10,000 to 50,000 times by an electron microscope or of a grain image projected onto a screen (the number of grains to be measured shall be 1000 or more at random).

The grain diameter distribution width of the highly monodisperse emulsion useful for the invention is preferably not more than 20%, and more preferably not more than 15%, wherein the grain diameter distribution width is defined by $$\frac{\text{Grain diameter standard deviation}}{\text{Average grain diameter}} \times 100 = \text{distribution width}(\%)$$

wherein the grain diameter is measured in accordance with the above-mentioned method, and the average grain diameter is an arithmetic mean:

$$\text{Average grain diameter} = \Sigma d_i n_i / \Sigma n_i$$

The silver halide of the silver halide emulsion of the invention is preferably silver iodobromide having an average silver iodide content of 4 to 20 mol%, more preferably 5 to 15 mol%.

The silver halide grain used in the invention has a high silver iodide-content phase thereinside.

The silver iodide content of the high silver iodide-content phase is preferably 15% to 45 mol%, more preferably 20 to 42 mol%, and most preferably 25 to 40 mol%.

The silver halide grain having the high silver iodide-content phase thereinside in the invention is one in which the high silver iodide-content phase is covered with a low silver iodide-content phase of which the silver iodide content is lower than that thereof.

The silver iodide content of the low silver iodide content phase that forms the outermost phase of the grain is preferably not more than 6 mol%, and more preferably 0 to 4 mol%. The outermost phase and the high silver iodide-content phase may have another silver iodide-content phase (intermediate phase) therebetween.

The silver iodide content of the intermediate phase is preferably 10 to 22 mol%, and more preferably 12 to 20 mol%.

The difference in the silver iodide content between the outermost phase and the intermediate phase and between the intermediate phase and the inside high silver iodide content phase is preferably 6 mol% or more, and more preferably 10% or more.

Further, in the above embodiment a different silver halide phase may also be present in the core of the high silver iodide content phase, between the inside high silver iodide content phase and the intermediate phase or between the intermediate phase and the outermost phase.

The volume of the outermost phase is preferably 4 to 70 mol%, and more preferably 10 to 50% of the whole grain. The volume of the high silver iodide content phase is preferably 10 to 80%, more preferably 20 to 50%, and most preferably 20 to 45% of the whole grain. The volume of the intermediate phase is preferably 5 to 60%, and more preferably 20 to 55% of the whole grain.

These phases each may be a single phase of a uniform composition or a group of a plurality of phases of uniform compositions or of stepwise varying compositions, or any arbitrary one of these phases may be of a continuouly varying composition, or the grain of the invention may be in combination of these phases.

There is another embodiment of the invention in which the silver iodide being present locally inside the grain does substantially not form a uniform phase but its content continuously changes from the grain's center toward the outside. In this instance, the silver iodide content preferably reduces gradually, starting from its maximum point, toward the outside of the grain.

The silver iodide content at the maximum point thereof is preferably 15 to 45 mol%, and more preferably 25 to 40 mol%.

The silver iodide content of the outermost phase of the grain is preferably not more than 6 mol%, and more preferably 0 to 4 mol%.

The silver halide emulsion of the invention preferably satisfies at least one of the following conditions (1) to (4):

(1) The average silver iodide content found by an X-ray fluorescence analysis ($J_1$) and the silver iodide content of the grain surface found by an X-ray photoelectron spectral analysis ($J_2$) should meet a relation of $J_1 > J_2$.

The grain diameter herein is the diameter of a circumcircle of the plane of the grain that makes its projected image area appear to be largest.

The X-ray photoelectron spectral analysis is explaned.

Prior to the measurement according to the X-ray photoelectron spectral analysis, an emulsion is subjected to the following pretreatment. The emulsion, after adding a pronase solution thereto, is stirred at 40° C. for one hour for gelatin decomposition, and then centrifuged to sediment its silver halide grains. After removing the supernatant in the decantation manner, to the grains is added a pronase solution for gelatin decomposition again in the same manner as above. The obtained sample is again centrifuged, decanted for removing the supernatant, redispersed in distilled water, centrifuged, and then again decanted for removing the supernatant. This cycle of the washing procedure is repeated three times. After that, the emulsion grains are redispersed in ethanol, which is then thinly coated on a mirror-like-polished silicon wafer to thereby prepare a sample for measurement.

The measurement according to the X-ray photoelectron spectral analysis may be performed by using, e.g., a measuring instrument ESCA/SAM60, manufactured by PHI Co., which uses Mg-K$\alpha$ rays as its excitation X-ray source and operates under conditions of an X-ray source voltage of 15 KV, an X-ray source current of 40mA and a pass energy of 50eV.

In order to find the surface halide composition, Ag3d, Br3d and I3d3/2 electrons are detected.

The composition ratio calculation is made according to a relative speed coefficient method, using the respective peaks' integral strengths. As the Ag3d, Br3d and I3d3/2 relative speeds, 5.10, 0.81 and 4.592, respectively, are used, whereby the composition ratio is given in atomic percentages.

(2) When comparing the average silver iodide content found according to the foregoing X-ray fluorescence analysis ($J_1$) and the average of the silver iodide content values measured on a silver halide crystal phase point which is 80% away in the grain diameter direction of its grain from the center thereof by use of an X-ray microanalysis ($J_3$), they should meet the relation of $J_1 > J_3$.

The X-ray microanalysis is explained. Silver halide grains are dispersed in the electron-microscopic observation grid of an electron microscope equipped with an energy-dispersion-type X-ray analyzer; the magnification of the electron microscope is set so as to have a single grain, while cooling it by liquid nitrogen, come in the CRT field of view; and the strengths of the AgL$\alpha$ and IL$\alpha$ rays are integrated for a given period of time. The IL$\alpha$/AgL$\alpha$ strength ratio and a calibration curve prepared beforehand are used whereby a value of the silver iodide content can be calculated.

(3) In the X-ray diffractometry using (420) X-ray emitted from a CuK$\alpha$-ray source, the grain is characterized by having its X-ray diffraction signal continuously present at a range of diffraction angle of not less than 1.5° at a height of its maximum peak height$\times$0.13, preferably at a range of diffraction angle of not less than 1.5° at a height of its maximum height$\times$0.15, more preferably at a range of diffraction angle of not less than 1.8° and most preferably not less than 2.0°. That the signal is present implies that the signal, at a height of its maximum peak height$\times$0.13 or 0.15, has a higher strength than the height.

A further preferred embodiment of the silver halide of the invention is that its (420) X-ray (CuK$\alpha$-ray) diffraction signal has two or three peaks, preferably three peaks.

The X-ray diffractometry is well known as a means for the examination of the crystal structure of silver halide. Above all, CuK$\alpha$ ray, generated from Cu as a target, is most widely used as an X-ray source.

Silver iodobromide has a rock salt structure, and its (420) diffraction of CuK$\alpha$ is observed at an angle of 2$\theta$ 71 to 74°. Since its signal is relatively strong and at a high angle, it is well resolvable and most suitable for crystal structure examination.

For the X-ray diffractometry of a photographic emulsion it is necessary to remove gelatin from and mix a reference sample such as silicon with the emulsion, and to measure the silver halide according to powder X-ray diffractometry.

For the above diffractometry reference can be made to the 'Kiso Bunseki Kagaku Koza, 24: X-sen Bunseki' ('Basic Course for Analytical Chemistry, 24: X-ray Analysis'), published by Kyoritsu Shuppan.

(4) Where the average silver iodide content values of individual silver halide grains are measured according to the foregoing X-ray microanalysis, the relative standard deviation of the measure values is preferably not more than 20%, more preferably not more than 15%, and most preferably not more than 12%.

The above relative standard deviation is defined by $$\frac{\text{AgI content standard deviation*}}{\text{Average AgI content}} \times 100$$

*The standard deviation of AgI content values obtained by measuring at least 100 emulsions.

The silver halide grain of the emulsion of the invention may be either a regular crystal such as a cubic, tetradecahedral or octadecahedral crystal or a twin such as a tabular crystal. The emulsion may also be a mixture of these crystal grains.

Where silver halide grains are tabular twin crystals, the number of the grains having a diameter/thickness ratio of 1 to 20, wherein the diameter is of a circle equivalent in the area to the projected grain image, accounts for preferably 60% or more of the whole projected number of grains, and the ratio is preferably not less than 1.2 and less than 8.0, and more preferably not less than 1.5 and less than 5.0.

For the preparation of a monodisperse regular crystal emulsion reference can be made to JP O.P.I. NOS. 177535/1984, 138538/1985, 52238/1984, 143331/1985, 35726/1985, 258536/1985 and 146363/1986.

A monodisperse twin crystal emulsion can be obtained by making reference to the method for growing spherical seed emulsion disclosed in JP O.P.I. No. 14636/1986.

For the growth of grains, a silver halide aqueous solution and a halide aqueous solution are added preferably by a doublejet process. Iodine can also be supplied to the system by adding silver iodide thereto. The above addition is made preferably at such a speed as to neither generate new nuclei nor cause the grain size distribution extension due to Ostwald ripening, i.e., at a speed in the range of 30 to 100% of the speed for generating new nuclei.

As other conditions for the growth of grains there is a method in which silver halide fine grains are added, dissolved and recrystalized to thereby grow grains as described in p.88 of the book of gists of papers presented to the anual convention '83 of the Society of Photographic Science and Technology of Japan.

The growth of silver halide grains is preferably made under conditions of pAg of 5 to 11, temperature of 40° to 85° C. and pH of 5 to 12.

The silver halide emulsion in the invention is subjected to physical ripening, chemical ripening and spectral sensitization treatments. The additives for use in these treatments are described in Research Disclosure (hereinafter abbreviated to RD) NoS. 17643, 18716 and 308119.

The known photographic additives for use in the invention are also described in the above mentioned RD numbers.

In the invention there may be used a variety of couplers, which are exemplified in the above-mentioned RD numbers.

The additives used in the invention may be added according to the dispersing method described in RD308119, XIV.

The light-sensitive material of the invention may be provided with auxiliary layers such as filter layers and intermediate layers as described in p.28 of RD17643, pp.647–648 of RD18716 and RD308119, XVII-K.

The light-sensitive material of the invention may take diverse layer structures such as the normal layer structure, inverted layer structure and unit structure described in RD 308119, VII-K.

The invention may apply to various color light-sensitive materials such as color negative films for general or movie use, color reversal films for slide or TV use, color photographic papers, color positive films and color reversal papers.

The light-sensitive material of the invention may be processed in the usual manner as described in p.28 of RD17643, p.647 Of RD18716 and RD308119, XIX.

EXAMPLES

Examples of the invention are described by making reference to the drawings.

Figure 2:
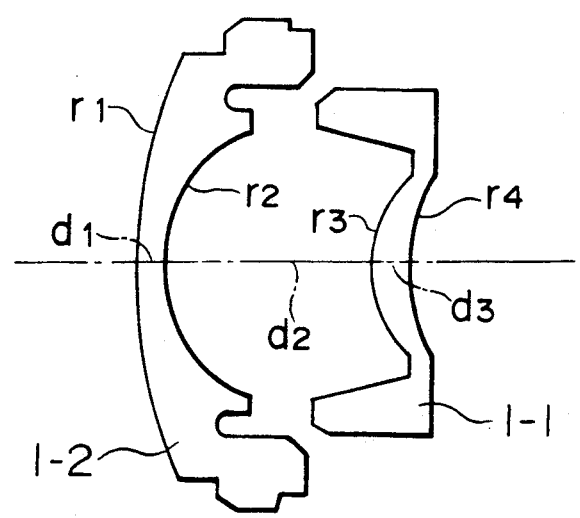
FIG. 2 is a cross-sectional view of an example of the lens of the camera unit of the invention, cut by a plane including the optica axis thereof.

FIG. 2 is a drawing showing the construction of the lens of the example, in which the left is the side of an object.

In the drawing, 1—1 is a first lens and 1—2 is a second lens, and on the right side are located a diaphragm and further a film plane.

The radius of curvature of the i-th lens counted from the object side is denoted by $r_1$ (i=first to fourth), and the i-th lens's distance between its faces by $d_1$ (i=first to third). The d in the foregoing conditions (5) and (7) is the same as $d_2$ in this drawing. The $d_4$, as shown in the drawing, is the distance between the fourth plane and the object side plane of diafragm 10 of FIG. 4.

The refractive index of the material of the j-th lens counted from the object side is denoted by $n_1$ (j - first, second). Accordingly, the n in the foregoing condition (6) is the same as $n_1$.

And, the aspherical plane is expressed by the following well-known equation:

$$X = [CY^2/\{1 + \sqrt{1 - (K + 1)C^2Y^2}\}] + A_4Y^4 + A_6Y^6 + A_8Y^8 + A_{10}Y^{10} + \ldots$$

wherein X is the coordinate axis in the optical axis direction of the aspherical plane, Y is the coordinate axis in the direction perpendicular to the optical axis, C is the radius of curvature on the optical axis, K is a conical constant and $A_m$ (m=4, 6, 8, 10 . . .) is a high-order aspherical coefficient. Therefore, an adopted aspherical plane can be spesified by being given the conical constant and aspherical coefficient. Out of the above radii of curvature $r_1$ to $r_4$, the radius of curvature $r_1$ provides the above radius of curvature on the optical axis C.

Example of the Lens

F-number=11, composite focal length F=17 mm, manufactured by PMMA.

| i | $r_1$ | $d_1$ | j | $n_1$ |
|---|-------|-------|---|-------|
| 1 | 22.27 | 1.0 | 1 | 1.61117 |
| 2 | 7.02 | 5.0 | | |
| 3 | 5.06 | 2.5 | 2 | 1.62299 |
| 4 | 17.07 | 1.5 | | |

In Example 1, the first lens is formed by SK8, and the second lens by SK15. The aspherical plane is adopted to the first, second and third planes.

Aspherical Plane (The First Plane)

$1 = 8.85 \times 10^{-1}$, $A_4 = -4.50 \times 10^{-5}$, $A_6 = 3.01 \times 10^{-8}$ Aspherical Plane (The Second Plane)

$k = 1.75 \times 10^{-1}$, $A_4 = \mathbf{3.91 \times 10^{-5}}$, $A_6 = -2.98 \times 10^{-8}$ Aspherical Plane (The Third Plane)

$k = 9.14 \times 10^{-2}$, $A_4 = 2.51 \times 10^{-5}$, $A_6 - 3.00 \times 10^{-8}$
$f_1 = 17.201$, $f_2 = 10.690$, $f_1/f_2 = -1.609$,
$r_2/\{(n-1)f_1\} = -0.668$, $d/f_1 = -0.291$
$f_1/f_2 + \{f_1/(f_1-d)\}^2 = -1.009$.

The spherical aberration, astigmatism and distortion of the above 2-group-2-element plastic lens were examined, and as a result, the lens was found useful for the camera unit of the invention.

Example of the Camera Body of the Camera Unit

The above lens was used to prepare a camera unit shown in FIG. 1 and FIG. 3, of which the specifications are: fixed F-number: 13.5, shutter speed: 1/100sec., angle of view: 105°, finder lens: Z-group-3-element lens, visual field rate: 90% shortest object distance: 30 cm, effective image area: 8.64 cm², and effective image frame aspect ratio: 1.50.

Example of the Silver Halide Color Light-Sensitive Material

In all the following examples, the adding ammounts constituents are shown in grams per m² except that those of silver halide and colloidal silver are in silver equivalent and those of sensitizing dyes in molar amounts per mol of silver.

EXAMPLE 1

On a triacetyl cellulose film support were formed the following layers in order from the support side, whereby a multilayer color photographic light-sensitive material Sample 101 was prepared.

| Sample 101 | |
|---|---|
| Layer 1: Antihalation layer HC-1 | |
| Black colloidal silver | 0.18 |
| UV absorbent UV-1 | 0.23 |
| High-boiling solvent Oil-1 | 0.18 |
| Gelatin | 1.42 |
| Layer 2: Intermediate layer IL-1 | |
| Gelatin | 1.27 |
| Layer 3: Low-speed red-sensitive emulsion layer RL | |
| Silver iodobromide emulsion (average grain size: 0.4 μm) | 1.0 |
| Sensitizing dye SD-1 | $1.8 \times 10^{-5}$ |
| Sensitizing dye SD-2 | $2.8 \times 10^{-4}$ |
| Sensitizing dye SD-3 | $3.0 \times 10^{-4}$ |
| Sensitizing dye SD-4 | $4.1 \times 10^{-4}$ |
| Cyan Coupler C-1 | 0.70 |
| Colored cyan coupler CC-1 | 0.066 |
| DIR compound D-1 | 0.028 |
| High-boiling solvent Oil-1 | 0.64 |
| Gelatin | 1.18 |
| Layer 4: Medium-speed red-sensitive emulsion layer RM | |

| Sample 101 | |
|---|---|
| Silver iodobromide emulsion (average grain size: 0.7 μm) | 0.8 |
| Sensitizing dye SD-1 | $2.1 \times 10^{-5}$ |
| Sensitizing dye SD-2 | $1.9 \times 10^{-4}$ |
| Sensitizing dye SD-3 | $9.6 \times 10^{-5}$ |
| Sensitizing dye SD-4 | $9.6 \times 10^{-5}$ |
| Cyan coupler C-1 | 0.28 |
| Colored cyan coupler CC-1 | 0.027 |
| DIR compound D-1 | 0.011 |
| High-boiling solvent Oil-1 | 0.26 |
| Gelatin | 0.58 |
| Layer 5: High-speed red-sensitive emulsion layer RH | |
| Silver iodobromide emulsion (average grain size: 0.8 μm) | 1.70 |
| Sensitizing dye SD-1 | $1.9 \times 10^{-5}$ |
| Sensitizing dye SD-2 | $1.7 \times 10^{-4}$ |
| Sensitizing dye SD-3 | $1.7 \times 10^{-4}$ |
| Cyan coupler C-2 | 0.14 |
| Colored cyan Coupler CC-1 | 0.02 |
| High-boiling solvent Oil-1 | 0.17 |
| Gelatin | 1.24 |
| Layer 6: Intermediate layer IL-2 | |
| Gelatin | 0.80 |
| Layer 7: Low-speed green-sensitive emulsion layer GL | |
| Silver iodobromide emulsion average grain size: 0.4 μm) | 1.1 |
| Sensitizing dye SD-4 | $6.8 \times 10^{-5}$ |
| Sensitizing dye SD-5 | $6.2 \times 10^{-4}$ |
| Magenta coupler M-1 | 0.54 |
| Magenta coupler M-2 | 0.19 |
| Colored magenta coupler CM-1 | 0.06 |
| DIR compound D-2 | 0.017 |
| DIR compound D-3 | 0.01 |
| High-boiling solvent Oil-2 | 0.81 |
| Gelatin | 1.77 |
| Layer 8: Medium-speed green-sensitive emulsion layer GM | |
| Silver iodobromide emulsion (average grain size: 0.7 μm) | 0.7 |
| Sensitizing dye SD-4 | $8.2 \times 10^{-5}$ |
| Sensitizing dye SD-6 | $1.9 \times 10^{-4}$ |
| Sensitizing dye SD-7 | $1.2 \times 10^{-4}$ |
| Sensitizing dye SD-8 | $1.5 \times 10^{-5}$ |
| Magenta coupler M-1 | 0.074 |
| Magenta coupler M-2 | 0.034 |
| Colored magenta coupler CM-1 | 0.043 |
| DIR compound D-2 | 0.018 |
| High-boiling solvent Oil-2 | 0.30 |
| Gelatin | 0.76 |
| Layer 9: High-speed green-sensitive emulsion layer GH | |
| Silver iodobromide emulsion (average grain size: 1.0 μm) | 1.7 |
| Sensitizing dye SD-4 | $2.1 \times 10^{-5}$ |
| Sensitizing dye SD-6 | $1.2 \times 10^{-4}$ |
| Sensitizing dye SD-7 | $1.0 \times 10^{-4}$ |
| Sensitizing dye SD-8 | $3.4 \times 10^{-6}$ |
| Magenta coupler M-1 | 0.094 |
| Magenta coupler M-3 | 0.044 |
| Colored magenta coupler CM-1 | 0.038 |
| High-boiling solvent Oil-2 | 0.31 |
| Gelatin | 1.23 |

| Sample 101 | |
|---|---|
| Layer 10: Yellow filter layer YC | |
| Yellow colloidal silver | 0.05 |
| Antistain agent SC-1 | 0.1 |
| High-boiling solvent Oil-2 | 0.125 |
| Gelatin | 0.7 |
| Formalin scavenger HS-1 | 0.04 |
| Formalin scavenger HS-2 | 0.04 |
| Layer 11: Intermediate layer IL-3 | |
| Gelatin | 0.5 |
| Formalin scavenger HS-1 | 0.05 |
| Formalin scavenger HS-2 | 0.05 |
| Layer 12: Low-speed blue-sensitive emulsion layer BL | |
| Silver iodobromide emulsion (average grain size: 0.4 μm) | 0.5 |
| Silver iodobromide emulsion (average grain size: 0.7 μm) | 0.5 |
| Sensitizing dye SD-9 | $5.2 \times 10^{-4}$ |
| Sensitizing dye SD-10 | $1.9 \times 10^{-5}$ |
| Yellow coupler Y-1 | 0.65 |
| Yellow coupler Y-2 | 0.24 |
| High-boiling solvent Oil-2 | 0.18 |
| Gelatin | 1.25 |
| Formalin scavenger HS-1 | 0.08 |
| Layer 13: High-speed blue-sensitive emulsion layer BH | |
| Silver iodobromide emulsion (average grain size: 1.0 μm) | 1.0 |
| Sensitizing dye SD-9 | $1.8 \times 10^{-4}$ |
| Sensitizing dye SD-10 | $7.9 \times 10^{-5}$ |
| Yellow coupler Y-1 | 0.18 |
| High-boiling solvent Oil-2 | 0.074 |
| Gelatin | 1.3 |
| Formalin scavenger HS-1 | 0.05 |
| Formalin scavenger HS-2 | 0.12 |
| Layer 14: First protective layer Pro-1 | |
| Fine-grained silver iodobromide emulsion (average grain size: 0.08 μm, AgI: 1 mol %) | 0.4 |
| UV absorbent UV-1 | 0.07 |
| UV absorbent UV-2 | 0.10 |
| High-boiling solvent Oil-1 | 0.07 |
| High-boiling solvent Oil-3 | 0.07 |
| Formalin scavenger HS-1 | 0.13 |
| Formalin scavenger HS-2 | 0.37 |
| Gelatin | 1.3 |
| Layer 15: Second protective layer Pro-2 | |
| Alkali-soluble matting agent (average particle size: 2 μm) | 0.13 |
| Polymethyl methacrylate (average particle size: 3 μm) | 0.02 |
| Lubricant WAX-1 | 0.04 |
| Gelatin | 0.6 |

Besides the above constituents, coating aid Su-1, dispersing assistant Su-2, viscosity adjusting agent, hardeners H-1 and H-2, stabilizer ST-1, antifoggant AF-1, and two kinds of AF-2 having weight average molecular weights of 10,000 and 1,100,000 were added.

The average grain size of each of the emulsions of the above sample is a value in terms of a cube. Each emulsion was subjected to optimal gold-sulfur sensitization.

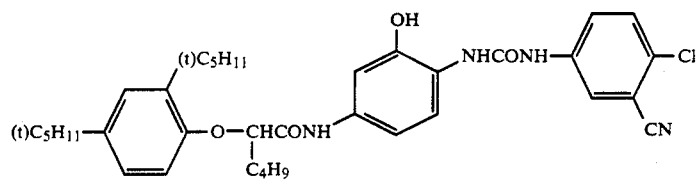

C-1

-continued
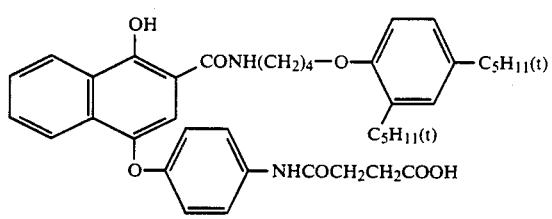
C-2
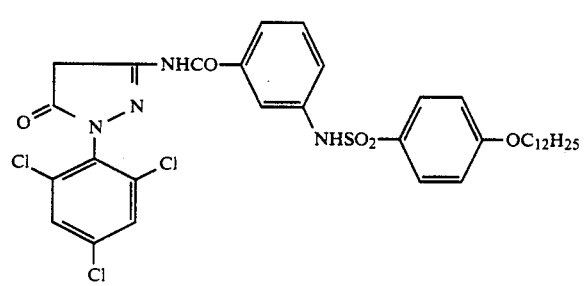
M-1
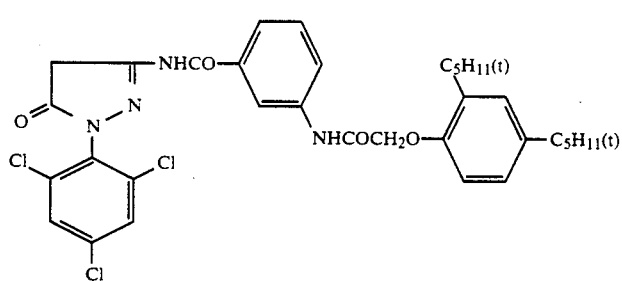
M-2
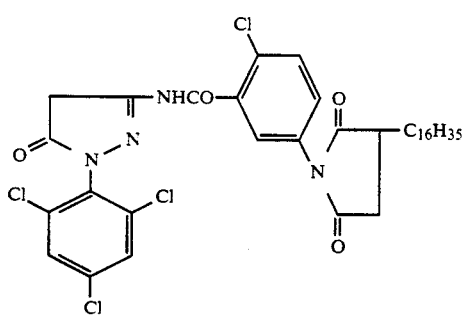
M-3
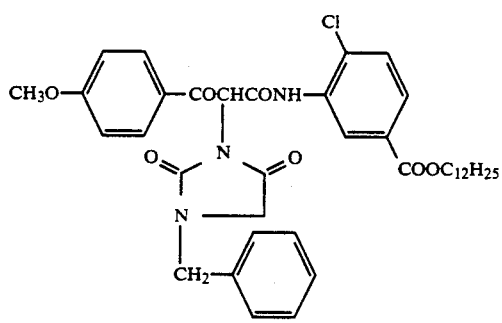
Y-1

-continued
Y-2
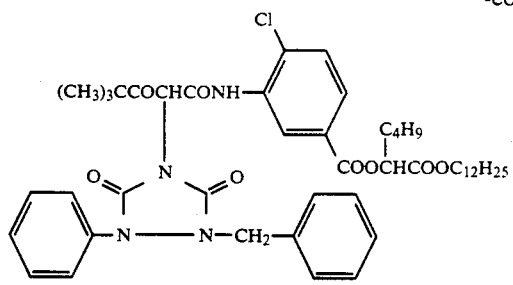
CC-1
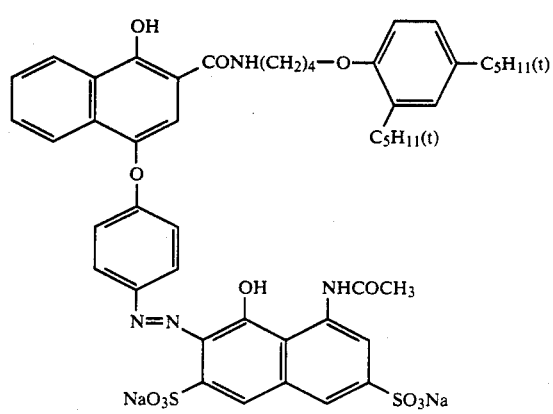
CM-1
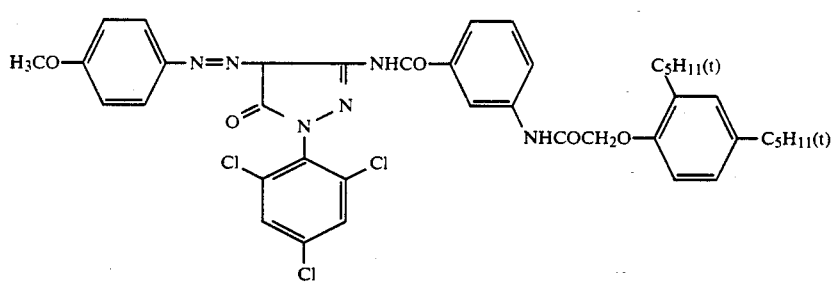
D-1
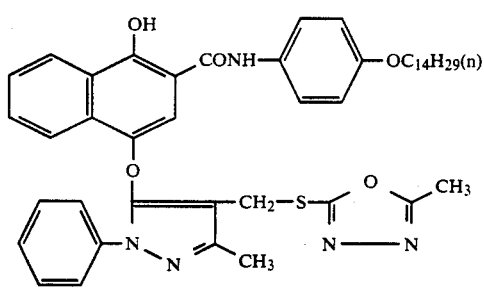
D-2
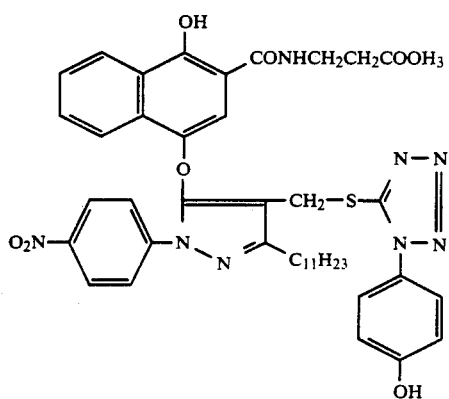

-continued
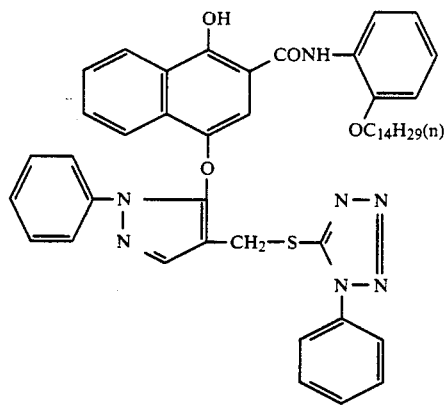
D-3
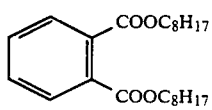
Oil-1
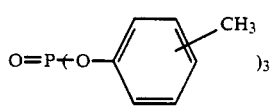
Oil-2
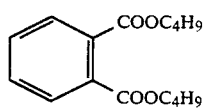
Oil-3
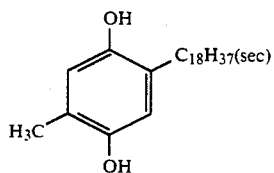
SC-1
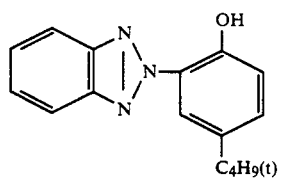
UV-1
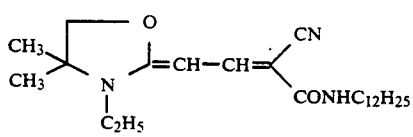
UV-2
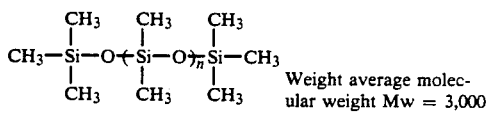
Weight average molecular weight Mw = 3,000
WAX-1
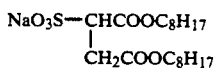
Su-1
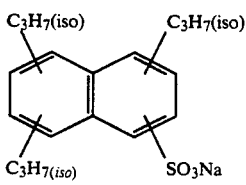
Su-2

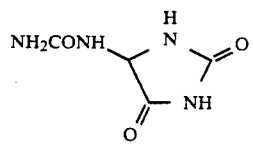
HS-1
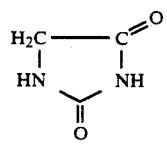
HS-2
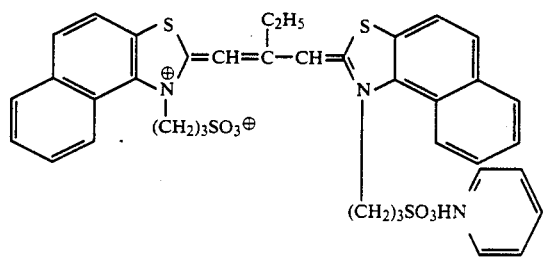
SD-1
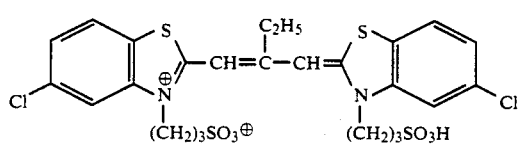
SD-2
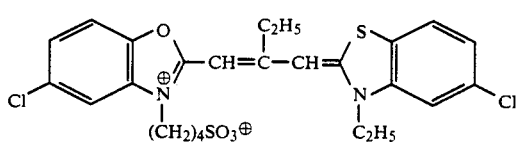
SD-3
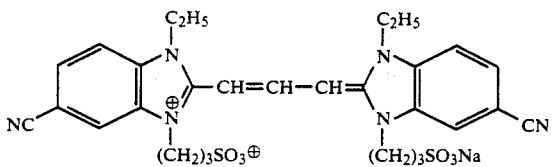
SD-4
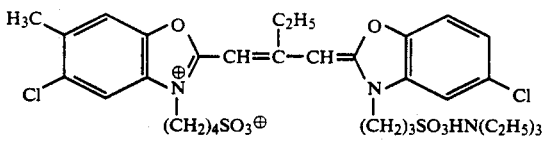
SD-5
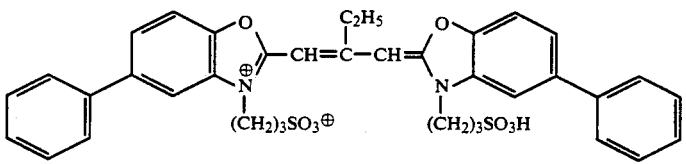
SD-6
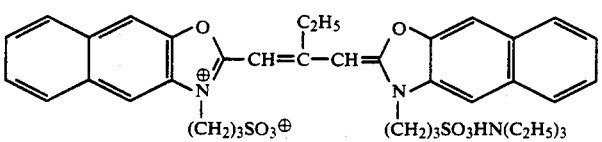
SD-7

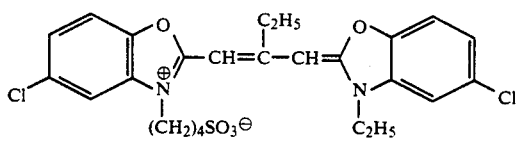 SD-8

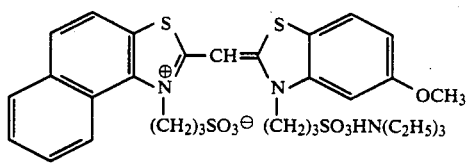 SD-9

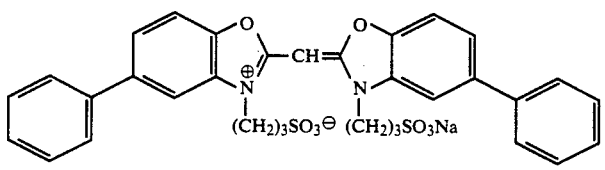 SD-10

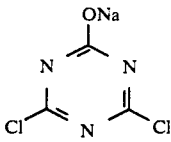 H-1

 H-2

(CH$_2$=CHSO$_2$CH$_2$)$_2$O

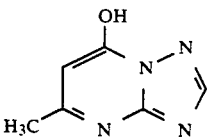 ST-1

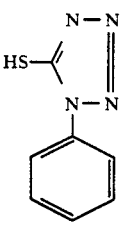 AF-1

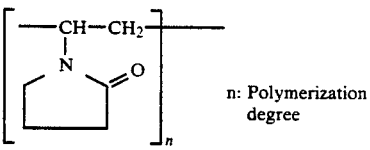 AF-2 n: Polymerization degree

Subsequently, Sample 102 having the following layers was prepared.

| Layer | Amount |
|---|---|
| Layer 1: Antihalation layer | |
| Black colloidal silver | 0.18 |
| Gelatin | 0.40 |
| Layer 2: Intermediate layer | |
| 2,-Di-t-pentadecylhydroquinone | 0.18 |
| EX-1 | 0.07 |
| EX-3 | 0.02 |
| U-1 | 0.08 |
| U-2 | 0.08 |
| HBS-1 | 0.10 |
| HBS-2 | 0.02 |
| Gelatin | 1.04 |
| Layer 3: First red-sensitive emulsion layer | |
| Silver iodobromide emulsion (average grain size: 0.7 μm) | 0.50 |
| Sensitizing dye I | $6.9 \times 10^{-5}$ |
| Sensitizing dye II | $1.8 \times 10^{-5}$ |
| Sensitizing dye III | $3.1 \times 10^{-4}$ |
| Sensitizing dye IV | $4.0 \times 10^{-5}$ |
| EX-2 | 0.350 |
| HBS-1 | 0.005 |
| HBS-2 | 0.012 |
| Gelatin | 1.0 |
| Layer 4: Second red-sensitive emulsion layer | |
| Silver iodobromide emulsion (average grain size: 0.7 μm) | 1.08 |
| Sensitizing dye I | $5.1 \times 10^{-5}$ |
| Sensitizing dye II | $1.4 \times 10^{-5}$ |
| Sensitizing dye III | $2.3 \times 10^{-4}$ |
| Sensitizing dye IV | $3.0 \times 10^{-5}$ |
| EX-2 | 0.300 |
| EX-3 | 0.050 |
| EX-10 | 0.004 |

| | |
|---|---|
| HBS-2 | 0.050 |
| Gelatin | 1.17 |
| Layer 5: Third red-sensitive emulsion layer | |
| Silver iodobromide emulsion (average grain Size: 1.00 μm) | 1.44 |
| Sensitizing dye IX | $5.4 \times 10^{-5}$ |
| Sensitizing dye II | $1.4 \times 10^{-5}$ |
| Sensitizing dye III | $2.4 \times 10^{-4}$ |
| Sensitizing dye IV | $3.1 \times 10^{-5}$ |
| EX-5 | 0.150 |
| EX-3 | 0.055 |
| EX-4 | 0.060 |
| EX-11 | 0.005 |
| HBS-1 | 0.32 |
| Gelatin | 1.47 |
| Layer 6: Intermediate layer | |
| HBS-1 | 0.01 |
| EX-12 | 1.06 |
| Gelatin | 1.06 |
| Layer 7: First green-sensitive emulsion layer | |
| Silver iodobromide emulsion (average grain size: 0.6 μm) | 0.36 |
| Sensitizing dye X | $1.5 \times 10^{-5}$ |
| Sensitizing dye V | $3.0 \times 10^{-5}$ |
| Sensitizing dye VI | $1.0 \times 10^{-4}$ |
| Sensitizing dye VII | $3.8 \times 10^{-4}$ |
| R-4 | 0.017 |
| EX-6 | 0.260 |
| EX-1 | 0.021 |
| EX-7 | 0.030 |
| EX-8 | 0.025 |
| HBS-1 | 0.100 |
| HBS-4 | 0.060 |
| Gelatin | 0.68 |
| Layer 8: Second green-sensitive emulsion layer | |
| Silver iodobromide emulsion (average grain size: 0.70 μm) | 0.72 |
| Sensitizing dye X | $1.0 \times 10^{-5}$ |
| Sensitizing dye V | $2.1 \times 10^{-5}$ |
| Sensitizing dye VI | $7.0 \times 10^{-5}$ |
| Sensitizing dye VII | $2.6 \times 10^{-4}$ |
| R-4 | 0.019 |
| EX-6 | 0.150 |
| EX-8 | 0.010 |
| EX-1 | 0.008 |
| EX-7 | 0.012 |
| HBS-1 | 0.60 |
| HBS-4 | 0.050 |
| Gelatin | 0.99 |
| Layer 9: Third green-sensitive emulsion layer | |
| Silver iodobromide emulsion (average grain size: 1.0 μm) | 1.09 |
| Sensitizing dye X | $1.2 \times 10^{-5}$ |
| Sensitizing dye V | $3.5 \times 10^{-5}$ |
| Sensitizing dye VI | $8.0 \times 10^{-5}$ |
| Sensitizing dye VII | $3.0 \times 10^{-4}$ |
| EX-6 | 0.065 |
| EX-1 | 0.025 |
| HBS-2 | 0.55 |
| Gelatin | 1.57 |
| Layer 10: Yellow filter layer | |
| Yellow colloidal silver | 0.05 |
| EX-12 | 0.04 |
| HBS-1 | 0.02 |
| Gelatin | 0.95 |
| Layer 11: First blue-sensitive emulsion layer | |
| Silver iodobromide emulsion (average grain size: 0.6 μm) | 0.22 |
| Sensitizing dye VIII | $3.5 \times 10^{-4}$ |
| EX-8 | 0.12 |
| EX-9 | 0.85 |
| EX-11 | 0.030 |
| HBS-1 | 0.28 |
| Gelatin | 1.15 |
| Layer 12: Second blue sensitive emulsion layer | |
| Silver iodobromide emulsion (average grain size: 0.80 μm) | 0.41 |
| Sensitizing dye VIII | $2.1 \times 10^{-4}$ |
| EX-9 | 0.20 |
| EX-10 | 0.015 |
| HBS-1 | 0.03 |
| Gelatin | 0.41 |
| Layer 13: Third blue-sensitive emulsion layer | |
| Silver iodobromide emulsion (average grain size: 1.20 μm) | 0.69 |
| Sensitizing dye VIII | $2.2 \times 10^{-4}$ |
| EX-9 | 0.20 |
| HBS-1 | 0.07 |
| Gelatin | 0.62 |
| Layer 14: First protective layer | |
| Silver iodobromide emulsion (average grain size: 0.07 μm) | 0.07 |
| U-1 | 0.11 |
| U-2 | 0.17 |
| HBS-1 | 0.90 |
| Gelatin | 1.00 |
| Layer 15: Second protective layer | |
| Polymethyl acrylate (particle size: 1.5 μm) | 0.54 |
| S-1 | 0.05 |
| S-2 | 0.05 |
| Gelatin | 0.72 |

To each of the above layers were added gelatin hardeners H-1 and H-2, antifoggants AF-3 and AF-4, and surfactant.

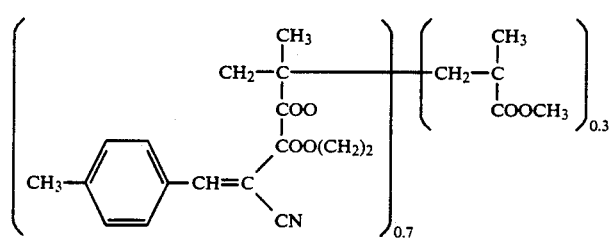

U-1

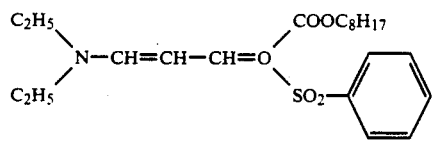

U-2

-continued
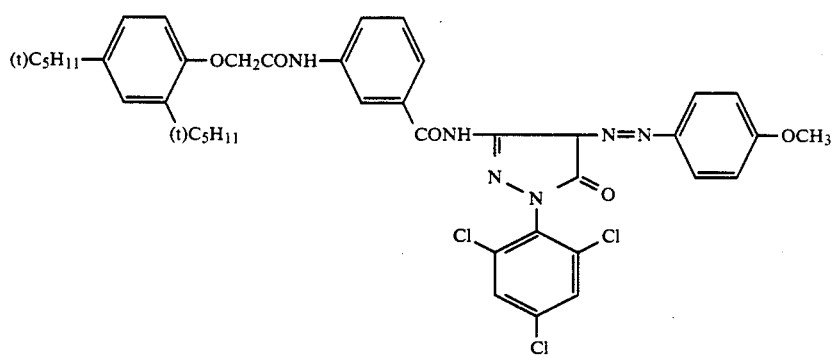
EX-1
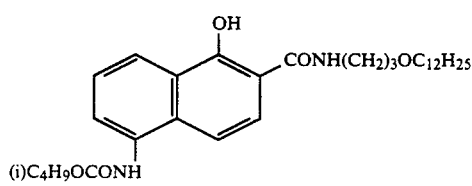
EX-2
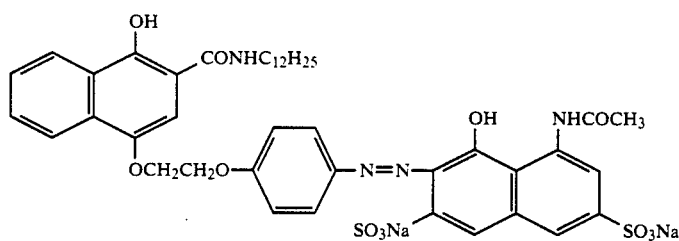
EX-3
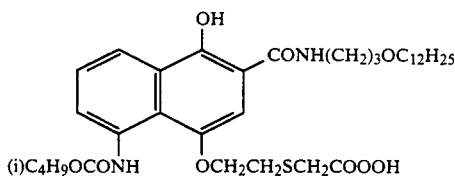
EX-4
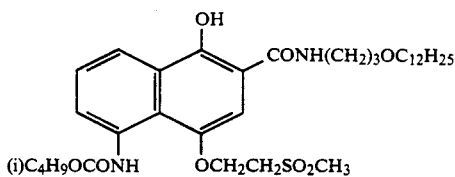
EX-5
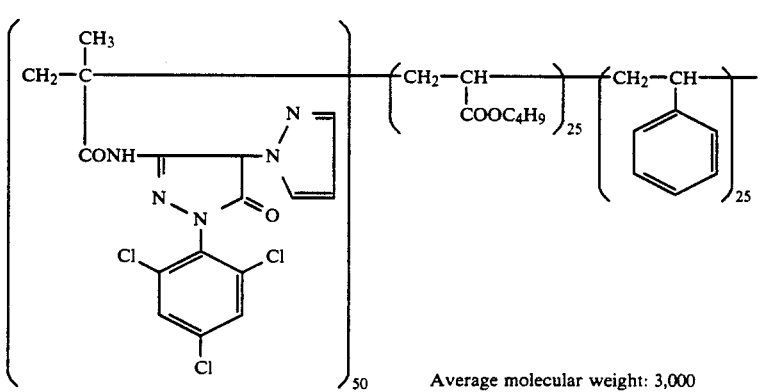
EX-6
Average molecular weight: 3,000

-continued
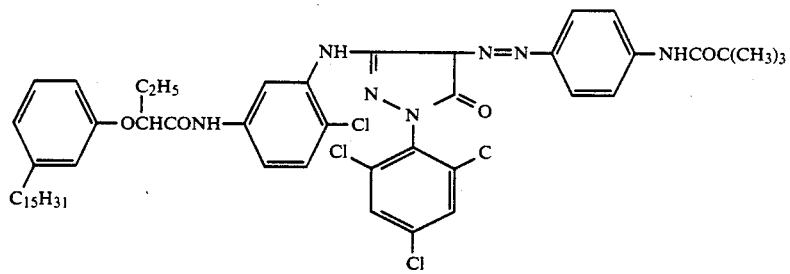
EX-7
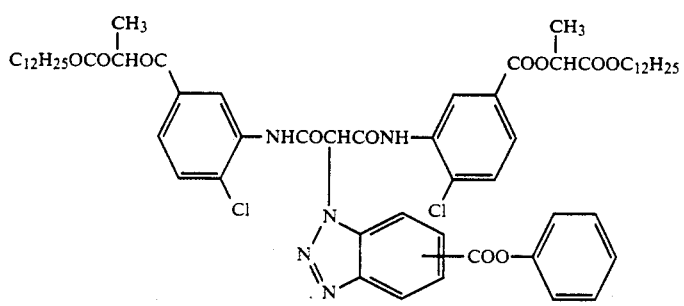
EX-8
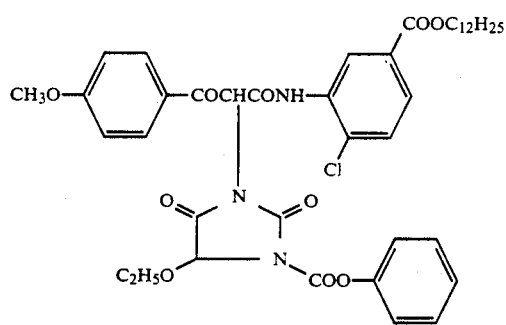
EX-9
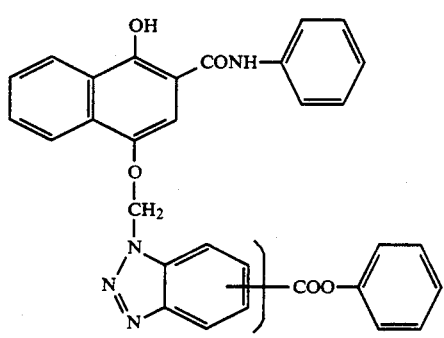
EX-10

-continued
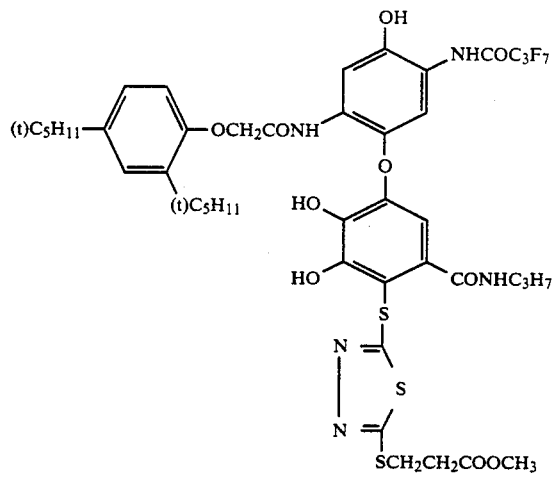
EX-11
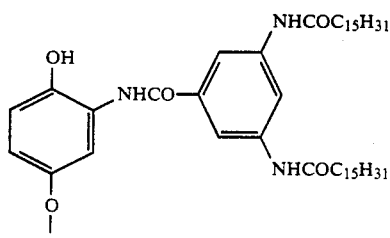
EX-12
Tricresyl phosphate HBS-1
Dibutyl phthalate HBS-2
Bis(2-ethylhexyl) phthalate HBS-3
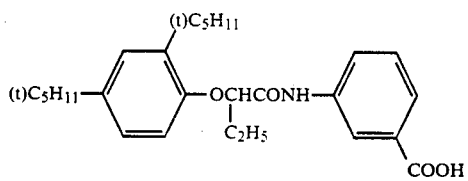
HBS-4
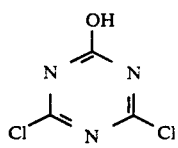
H-1
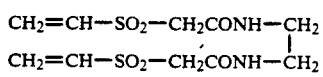
H-2
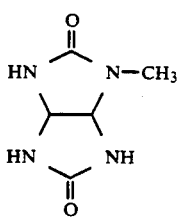
S-1
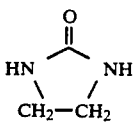
S-2

-continued
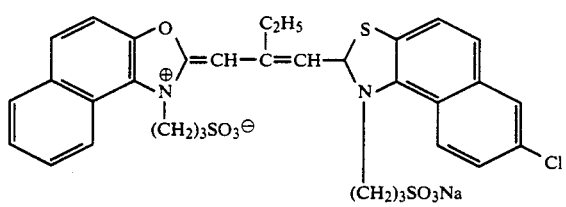
Sensitizing dye I
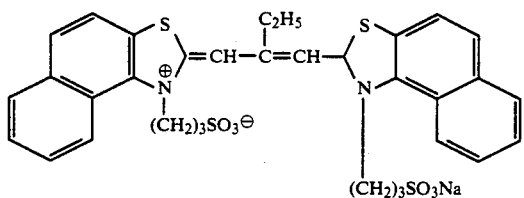
Sensitizing dye II
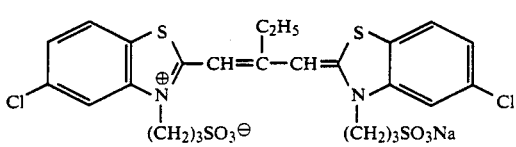
Sensitizing dye III
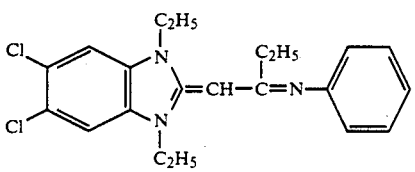
Sensitizing dye IV
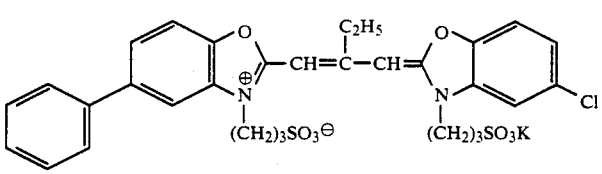
Sensitizing dye V
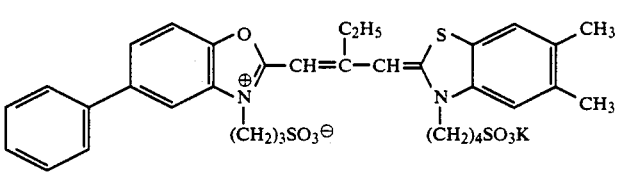
Sensitizing dye VI
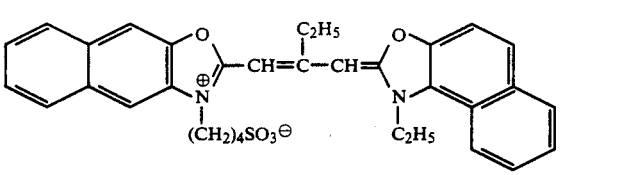
Sensitizing dye VII
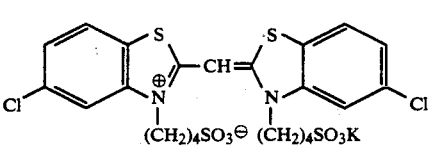
Sensitizing dye VIII
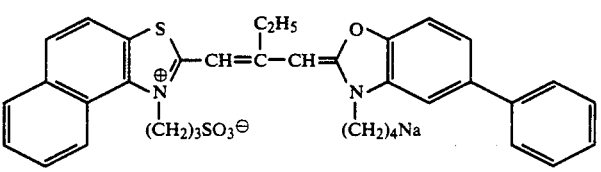
Sensitizing dye IX

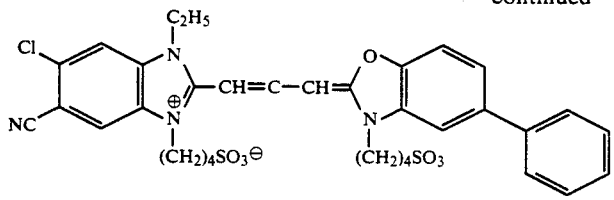

Sensitizing dye X

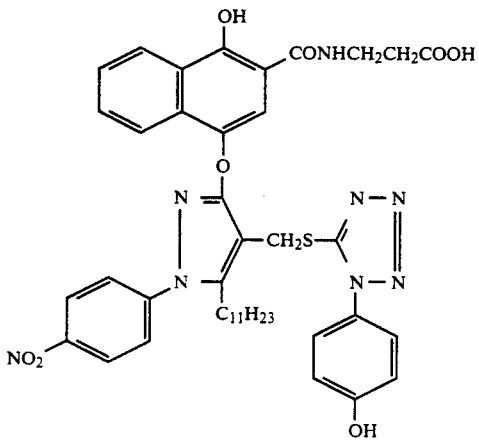

R-4

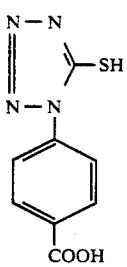

AF-1

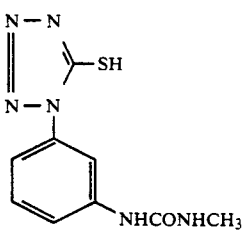

AF-2

The compositions of Layers 7 and 8 of Sample 102 were changed as follows to prepare Sample 103.

Layer 7:

The same as the Layer 7 of Sample 102 except that the amount of the silver iodobromide emulsion (average grain size: 0.65 μm) was changed to 0.20 and that of the EX-6 to 0.300.

Layer 8:

The same as the Layer 8 of Sample 102 except that the amount of the silver iodobromide emulsion (average grain size: 0.70 μm) was changed to 0.85.

The compositions of Layers 8 and 9 of Sample 102 were changed as follows to prepare Sample 104.

Layer 8:

The same as the Layer 8 of Sample 102 except that the amount of the silver iodobromide emulsion (average grain size: 0.70) was changed to 0.60 and that of the EX-6 to 0.200.

Layer 9:

The same as the Layer 9 of Sample 102 except that the amount of the silver iodobromide emulsion (average grain size: 1.0 μm) was changed to 1.25 and that of the EX-6 to 0.060.

The ISO speed of each of the thus obtained light-sensitive material Samples 101 to 104 was determined in accordance with the determining method described previously in the Detailed Description section. At the same time, the previously mentioned Dmin(Y), Dmin(M) and Dmin(C) of each sample were determined.

Next, $g_i$, h and $j_i$ were found according to the method described previously in the Detailed Description section.

| Sample 101 | | | | | |
|---|---|---|---|---|---|
| B | $g_{B1}$ | $g_{B2}$ | $g_{B3}$ | $g_{B4}$ | $g_{B5}$ |
| ($h_B$ = 0.76) | 0.72 | 0.82 | 0.80 | 0.74 | 0.76 |
| | $j_{B1}$ | $j_{B2}$ | $j_{B3}$ | $j_{B4}$ | $j_{B5}$ |
| | 0.95 | 1.05 | 1.05 | 0.97 | 1.00 |
| G | $g_{G1}$ | $g_{G2}$ | $g_{G3}$ | $g_{G4}$ | $g_{G5}$ |
| ($h_G$ = 0.62) | 0.59 | 0.64 | 0.64 | 0.62 | 0.59 |
| | $j_{G1}$ | $j_{G2}$ | $j_{G3}$ | $j_{G4}$ | $j_{G5}$ |

-continued

| | | | | | |
|---|---|---|---|---|---|
| | 0.95 | 1.03 | 1.03 | 1.00 | 0.95 |
| R | $g_{R1}$ | $g_{R2}$ | $g_{R3}$ | $g_{R4}$ | $g_{R5}$ |
| ($h_R$ = 0.56) | 0.58 | 0.58 | 0.56 | 0.54 | 0.54 |
| | $j_{R1}$ | $j_{R2}$ | $j_{R3}$ | $j_{R4}$ | $j_{R5}$ |
| | 1.04 | 1.04 | 1.00 | 0.96 | 0.96 |
| Sample 102 | | | | | |
| B | $g_{B1}$ | $g_{B2}$ | $g_{B3}$ | $g_{B4}$ | $g_{B5}$ |
| ($h_B$ = 0.65) | 0.52 | 0.68 | 0.74 | 0.72 | 0.58 |
| | $j_{B1}$ | $j_{B2}$ | $j_{B3}$ | $j_{B4}$ | $j_{B5}$ |
| | 0.80 | 1.05 | 1.14 | 1.11 | 0.90 |
| G | $g_{G1}$ | $g_{G2}$ | $g_{G3}$ | $g_{G4}$ | $g_{G5}$ |
| ($h_G$ = 0.53) | 0.52 | 0.56 | 0.56 | 0.52 | 0.48 |
| | $j_{G1}$ | $j_{G2}$ | $j_{G3}$ | $j_{G4}$ | $j_{G5}$ |
| | 0.98 | 1.06 | 1.06 | 0.98 | 0.91 |
| R | $g_{R1}$ | $g_{R2}$ | $g_{R3}$ | $g_{R4}$ | $g_{R5}$ |
| ($h_R$ = 0.52) | 0.50 | 0.56 | 0.58 | 0.52 | 0.42 |
| | $j_{R1}$ | $j_{R2}$ | $j_{R3}$ | $j_{R4}$ | $j_{R5}$ |
| | 0.96 | 1.08 | 1.12 | 1.00 | 0.81 |
| Sample 103 | | | | | |
| B | $g_{B1}$ | $g_{B2}$ | $g_{B3}$ | $g_{B4}$ | $g_{B5}$ |
| ($h_B$ = 0.67) | 0.52 | 0.68 | 0.74 | 0.73 | 0.60 |
| | $j_{B1}$ | $j_{B2}$ | $j_{B3}$ | $j_{B4}$ | $j_{B5}$ |
| | 0.78 | 1.01 | 1.11 | 1.09 | 0.90 |
| G | $g_{G1}$ | $g_{G2}$ | $g_{G3}$ | $g_{G4}$ | $g_{G5}$ |
| ($h_G$ = 0.50) | 0.52 | 0.58 | 0.54 | 0.48 | 0.38 |
| | $j_{G1}$ | $j_{G2}$ | $j_{G3}$ | $j_{G4}$ | $j_{G5}$ |
| | 1.04 | 1.16 | 1.08 | 0.96 | 0.76 |
| R | $g_{R1}$ | $g_{R2}$ | $g_{R3}$ | $g_{R4}$ | $g_{R5}$ |
| ($h_R$ = 0.55) | 0.49 | 0.56 | 0.62 | 0.54 | 0.54 |
| | $j_{R1}$ | $j_{R2}$ | $j_{R3}$ | $j_{R4}$ | $j_{R5}$ |
| | 0.89 | 1.02 | 1.13 | 0.98 | 0.98 |
| Sample 104 | | | | | |
| B | $g_{B1}$ | $g_{B2}$ | $g_{B3}$ | $g_{B4}$ | $g_{B5}$ |
| ($h_B$ = 0.60) | 0.50 | 0.58 | 0.65 | 0.74 | 0.54 |
| | $j_{B1}$ | $j_{B2}$ | $j_{B3}$ | $j_{B4}$ | $j_{B5}$ |
| | 0.83 | 0.97 | 1.08 | 1.23 | 0.90 |
| G | $g_{G1}$ | $g_{G2}$ | $g_{G3}$ | $g_{G4}$ | $g_{G5}$ |
| ($h_G$ = 0.53) | 0.55 | 0.62 | 0.53 | 0.50 | 0.45 |
| | $j_{G1}$ | $j_{G2}$ | $j_{G3}$ | $j_{G4}$ | $j_{G5}$ |
| | 1.04 | 1.17 | 1.00 | 0.94 | 0.85 |
| R | $g_{R1}$ | $g_{R2}$ | $g_{R3}$ | $g_{R4}$ | $g_{R5}$ |
| ($h_R$ = 0.52) | 0.49 | 0.57 | 0.58 | 0.52 | 0.42 |
| | $j_{R1}$ | $j_{R2}$ | $j_{R3}$ | $j_{R4}$ | $j_{R5}$ |
| | 0.94 | 1.10 | 1.12 | 1.00 | 0.81 |

Samples 101 to 104 were loaded separately in the foregoing camera units described in the previous Example, which each has a lens aperture of F=13.5 and a shutter set at a speed of 1/100 sec.

With each of the above camera units, pictures of three hundred daylight scenes were actually taken so as to make prints therefrom later for evaluation by comparison. The exposed negative films were processed in the color developer solution and accompanying baths for use in ISO speed determination.

After that, we had five printing operators ovserve the processed negatives to ask for evaluating the results thereof in the manner of ranking Samples 101 to 104 in the printingcondition-easily-determinable order. The smaller the sample's ranked number, the easier the determination of printing conditions of it as negatives.

Then, the above negatives were printed on KONICA paper type SR by exposing it through the negatives in a NPS CLP-2000L printer, manufactured by KONICA Corp., and the exposed paper was processed in CPK-18 processing solutions, whereby the prints thereof were obtained.

The proportion of the best finished ones among the obtained prints were evaluated by five panelers to find the printing yield by samples. The results are shown in the following table.

TABLE

| Sample No. | ISO speed | Rank of negatives | Printing yield |
|---|---|---|---|
| 101 (Invention) | 450 | 1 | 93% |
| 102 (Invention) | 420 | 2 | 91% |
| 103 (Comparative) | 370 | 4 | 84% |
| 104 (Comparative) | 320 | 3 | 80% |

As is apparent from the above table, the camera unit of the invention is an inexpensive camera unit which is capable of giving a high printing yield as well as of providing negatives enabling printer operators to easily determine printing conditions necessary to give best finished prints in a photofinishing laboratory.

What is claimed is:

1. A camera unit packed in the form of a product comprising a camera and a silver halide color photographic light-sensitive material loaded beforehand in said camera, wherein
    said camera comprises a lens having a focal length of not more than 23 mm, and
    said light-sensitive material has an ISO speed of not less than 300 and comprises a support having thereon a red-sensitive emulsion layer for forming a cyan image, a green-sensitive emulsion layer for forming a magenta image and a blue-sensitive emulsion layer for forming a yellow image, wherein at least one of said emulsion layers has a photographic characteristic curve satisfying the following requirements,
    the ratios $j_1 = g_1/h$, $j_2 = g_2/h$, $j_3 = g_3/h$, $j_4 = g_4/h$ and $j_5 = g_5/h$ are each $1.00 \pm 0.10$,
    wherein $g_1$, $g_2$, $g_3$, $g_4$, and $g_5$ are defined by equations
    $g_1 = (d_1 - d_0)/0.5$, $g_2 = (d_2 - d_1)/0.5$,
    $g_3 = (d_3 - d_2)/0.5$, $g_4 = (d_4 - d_3)/0.5$,
    $g_5 = (d_5 - d_4)/0.5$; and h is defined by an equation $h = (d_5 - d_0)/2.5$, in which $d_0$ is the density of $D_{min} + 0.15$, $D_{min}$ is the minimum density of said characteristic curve, and $d_1$, $d_2$, $d_3$ and $d_4$ are each densities corresponding to the exposure amounts of log $E_1$ = log $E_0$ + 0.5, log $E_2$ = log $E_1$ + 0.5, log $E_3$ = log $E_2$ + 0.5, log $E_4$ = log $E_3$ + 0.5 and log $E_5$ = log $E_4$ + 0.5, respectively, in which $E_0$ is an exposure amount necessary for forming the density of $d_0$.

2. The camera unit of claim 1, wherein said lens has a structure of 2-group-2-element.

3. The camera unit of claim 2, wherein said lens comprises a first lens having a negative refractive index and a second lens having a positive refractive index and has one or more aspherical planes.

4. The camera unit of claim 1, wherein at least one element of said lens is a plastic lens.

5. The camera unit of claim 1, wherein said camera unit has a fixed diaphragm for making a F-number of said lens to 12.5 or more.

6. The camera unit of claim 1, wherein said unit has a fixed diaphragm for making a F-number of said lens to 12.5 or more and at least one element of said lens is a plastic lens 7. The camera unit of claim 1, wherein wherein said unit has a fixed diaphragm for making a F-number of said lens to 12.5 or more and said camera has a structure of 2-group-2-element.

8. The camera unit of claim 1, wherein the shortest object distance of said camera unit is not longer than 80 mm.

9. The camera unit of claim 1, wherein said unit has a a view finder having a visual field rate of not less than 90%.

10. The camera unit of claim 1, wherein said unit has a a view finder having a visual field rate of not less than 90% and the shortest object distance of said camera unit is not longer than 80 mm.

11. The camera unit of claim 1, wherein said camera unit comprises a camera part a cartridge part, and said cartridge part is attachable to and detachable from said camera part and serve as the backlid of said camera part.

12. The camera unit of claim 1, wherein said camera unit has an electronic flash lamp.

13. A camera unit packed in the form of a product comprising a camera and a silver halide color photographic light-sensitive material loaded beforehand in said camera, wherein said camera comprises a 2 group-2element lens having a focal length of not more than 23mm and a view finder having a visual field rate of not less than 90%, and the shortest object distance of said camera unit is not longer than 80 mm, in which said lens comprises a first lens having a negative refractive index and a second lens having a positive refractive index and at least one of which has aspherical planes and at least one of which is a plastic lens, and said light-sensitive material has an ISO speed of not less than 300 and comprises a support having thereon a red-sensitive emulsion layer for forming a cyan image, a green-sensitive emulsion layer for forming a magenta image and a blue-sensitive emulsion layer for forming a yellow image, wherein at least one of said emulsion layers has a photographic characteristic curve satisfying the following requirements, the ratios $j_1=g_1/h$, $j_2=g_2/h$, $j_3=g_3/h$, $j_4=g_r/h$ and $j_5=g_5/h$ are each $1.00\pm0.10$, wherein $g_1$, $g_2$, $g_3$, $g_4$, and $g_5$ are defined by equations $g_1=(d_1-d_0)/0.5$, $g_2=(d_2-d_1)/0.5$, $g_3=(d_3-d_2)/0.5$, $g_4=(d_4-d_3)/0.5$, $g_5=(d_5-d_4)/0.5$; and h is defined by an equation $h=(d_5-d_0)/2.5$, in which $d_0$ is the density of $D_{min}+0.15$, $D_{min}$ is the minimum density of said characteristic curve, and $d_1$, $d_2$, $d_3$ and $d_4$ are each densities corresponding to the exposure amounts of $\log E_1=\log E_0+0.5$, $\log E_2=\log E_1+0.5$, $\log E_3=\log E_2+0.5$, $\log E_4=\log E_3+0.5$ and $\log E_5=\log E_4+0.5$, respectively, in which $E_0$ is an exposure amount necessary for forming the density of $d_0$.

* * * * *

UNITED STATES PATENT AND TRADEMARK OFFICE
CERTIFICATE OF CORRECTION

PATENT NO. : 5,223,871
DATED : June 29, 1993
INVENTOR(S) : Masaru Iwagaki et al.

It is certified that error appears in the above-indentified patent and that said Letters Patent is hereby corrected as shown below:

Claim 5, column 42, line 56, change "a F-number" to --an F-number--.

Claim 6, column 42, line 59, change "a F-number" to --an F-number--.

Claim 7, column 42, line 62, delete (second occurrence) of "wherein".

Claim 7, column 42, line 63, change "a F-number" to --an F-number--.

Claim 9, column 43, line 2, delete "a".

Claim 10, column 42, line 5, delete (second occurrence) of "a".

Claim 11, column 43, line 9, insert --,-- after the first occurrence of "part".

UNITED STATES PATENT AND TRADEMARK OFFICE
CERTIFICATE OF CORRECTION

PATENT NO. : 5,223,871
DATED : June 29, 1993
INVENTOR(S) : Masaru Iwagaki et al.

It is certified that error appears in the above-indentified patent and that said Letters Patent is hereby corrected as shown below:

Claim 11, column 43, line 11, change "serve " to --serves--.

Claim 13, column 43, line 18, change "2group-2element" to --2-group-2-element--.

*Claim 13, column 44, line 12, change "$j_4 = g_r/h$". to --$j_4 = g_4/h$--.

Signed and Sealed this

Twenty-seventh Day of September, 1994

Attest:

BRUCE LEHMAN

Attesting Officer      Commissioner of Patents and Trademarks